US012356250B2

(12) United States Patent
Sun

(10) Patent No.: US 12,356,250 B2
(45) Date of Patent: Jul. 8, 2025

(54) COMMUNICATION METHOD, APPARATUS, AND SYSTEM

(71) Applicant: HUAWEI TECHNOLOGIES CO., LTD., Shenzhen (CN)

(72) Inventor: Haiyang Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 17/953,766

(22) Filed: Sep. 27, 2022

(65) Prior Publication Data

US 2023/0021830 A1 Jan. 26, 2023

Related U.S. Application Data

(63) Continuation of application No. PCT/CN2021/072911, filed on Jan. 20, 2021.

(30) Foreign Application Priority Data

Apr. 7, 2020 (CN) .......................... 202010263683.5

(51) Int. Cl.
H04W 28/08 (2023.01)
(52) U.S. Cl.
CPC .............................. H04W 28/0992 (2020.05)
(58) Field of Classification Search
CPC ............. H04L 65/1016; H04L 65/1046; H04L 65/1069; H04L 65/80
See application file for complete search history.

(56) References Cited

U.S. PATENT DOCUMENTS

2018/0192471 A1  7/2018  Li et al.
2019/0357082 A1  11/2019  Kim et al.
2019/0357294 A1* 11/2019  Ha .......................... H04W 76/15
2021/0329541 A1* 10/2021  Salkintzis ............. H04W 88/06

FOREIGN PATENT DOCUMENTS

| CN | 110351893 A | 10/2019 |
| CN | 110831070 A | 2/2020 |
| CN | 110832897 A | 2/2020 |
| EP | 4133891 A1 | 2/2023 |

(Continued)

OTHER PUBLICATIONS

Ericsson, "PCC and N4 handling of ATSSS", SA WG2 Meeting #129 S2-1810965, Oct. 19, 2018, total 15 pages.

(Continued)

Primary Examiner — Zhensheng Zhang
(74) Attorney, Agent, or Firm — HAUPTMAN HAM, LLP

(57) ABSTRACT

A communication method includes obtaining, by a policy control network element, an application identifier. The communication method further includes determining, by the policy control network element, a first application descriptor based on the application identifier. The communication method further includes sending, by the policy control network element, the first application descriptor to a session management network element. The first application descriptor is useable for generating an access traffic steering, switching, and splitting (ATSSS) rule. The ATSSS rule includes the first application descriptor.

16 Claims, 11 Drawing Sheets

(56) References Cited

FOREIGN PATENT DOCUMENTS

| WO | 2019192528 A1 | 10/2019 |
|---|---|---|
| WO | 2021205381 A1 | 10/2021 |

OTHER PUBLICATIONS

Apple et al., "Deprecating OS Id and OS App Id from URSP and ATSSS rules", SA WG2 Meeting #136-AH 62-2000916, Jan. 17, 2020, total 19 pages.

3GPP TS 23.501 V16.4.0:"3rd Generation Partnership Project;Technical Specification Group Services and System Aspects;System architecture for the 5G System (5GS);Stage 2(Release 16)",Mar. 2020,total 430 pages.

3GPP TS 23.502 V16.4.0 :"3rd Generation Partnership Project;Technical Specification Group Services and System Aspects;Procedures for the 5G System (5GS);Stage 2(Release 16)",Mar. 2020,total 582 pages.

3GPP TS 23.503 V16.4.1:"3rd Generation Partnership Project;Technical Specification Group Services and System Aspects;Policy and charging control framework for the 5G System (5GS);Stage 2(Release 16)",Apr. 2020,total 115 pages.

3GPP TSG-WG SA2 Meeting #137E e-meeting, S2-2002185,Correction on Application Descriptor in ATSSS rule, Huawei, HiSilicon,total 3 pages.

International Search Report issued in corresponding International Application No. PCT/CN2021/072911, mailed Apr. 19, 2021, pp. 1-26.

Extended European Search Report issued in corresponding European Application No. 21785606.1, dated Jul. 20, 2023, pp. 1-9.

Chinese Office Action issued in corresponding Chinese Application No. 202010263683.5, dated Nov. 29, 2022, pp. 1-23.

\* cited by examiner

COMMUNICATION METHOD, APPARATUS, AND SYSTEM

CROSS-REFERENCE TO RELATED APPLICATIONS

This application is a continuation of International Patent Application No. PCT/CN2021/072911, filed on Jan. 20, 2021, which claims priority to Chinese Patent Application No. 202010263683.5, filed on Apr. 7, 2020. The disclosures of the aforementioned applications are hereby incorporated by reference in their entireties.

TECHNICAL FIELD

This application relates to the field of communication technologies, and in particular, to a communication method, an apparatus, and a system.

BACKGROUND

Currently, an access traffic steering, switching, and splitting (ATSSS) rule is introduced to a 5th generation (5G) network, so that a terminal device may control splitting of a service according to the ATSSS rule. For example, the terminal device determines, according to the ATSSS rule, that service data flows are transmitted only using a 3rd generation partnership project (3GPP) access technology, only a non-3GPP (Non-3GPP) access technology, or both a 3GPP access technology and a non-3GPP access technology, meaning that splitting is performed by using the two access technologies.

The ATSSS rule is generated by a session management network element and sent by the session management network element to the terminal device. The ATSSS rule includes an application descriptor. However, currently, there is no related solution to how a session management network element accurately determines an application descriptor in an ATSSS rule when generating the ATSSS rule.

SUMMARY

This application provides a communication method, an apparatus, and a system, to accurately determine an application descriptor in an ATSSS rule.

According to a first aspect, an embodiment of this application provides a communication method. The communication method includes: A policy control network element obtains an application identifier, determines a first application descriptor based on the application identifier, and sends the first application descriptor to a session management network element, where the first application descriptor is for generating an ATSSS rule, and the ATSSS rule includes the first application descriptor.

Based on the foregoing implementation solution, the policy control network element may determine the application descriptor, and send the application descriptor to the session management network element, so that the session management network element may generate the ATSSS rule based on the application descriptor. In this way, the ATSSS rule is accurately generated, and the method is simple and easy to implement.

In a possible implementation method, that the policy control network element sends the first application descriptor to a session management network element includes: The policy control network element sends a PCC rule and first information to the session management network element, where the PCC rule includes the application identifier, and the first information includes a correspondence between the application identifier and the first application descriptor; the policy control network element sends a PCC rule to the session management network element, where the PCC rule includes the application identifier and the first application descriptor; or the policy control network element sends a PCC rule to the session management network element, where the PCC rule includes the first application descriptor.

In a possible implementation method, the policy control network element obtains operating system identification information of a terminal device. That the policy control network element determines a first application descriptor based on the application identifier includes: The policy control network element determines the first application descriptor based on the operating system identification information and the application identifier, where the first application descriptor includes an operating system identifier and an operating system application identifier that are of the terminal device.

In a possible implementation method, that the policy control network element determines the first application descriptor based on the operating system identification information and the application identifier includes: The policy control network element determines, based on a correspondence among the operating system identification information, the application identifier, and the first application descriptor, the first application descriptor corresponding to the operating system identification information and the application identifier, where the correspondence is stored in the policy control network element, a unified data repository, a network exposure function network element, or an application function network element.

In a possible implementation method, that the policy control network element determines the first application descriptor based on the operating system identification information and the application identifier includes: The policy control network element determines, based on the application identifier, a second application descriptor corresponding to the application identifier; and the policy control network element determines, based on the operating system identification information and the second application descriptor, the first application descriptor that is in the second application descriptor and that corresponds to the operating system identification information.

In a possible implementation method, that the policy control network element obtains operating system identification information of a terminal device includes: The policy control network element receives the operating system identification information from the session management network element; the policy control network element receives identification information of the terminal device from the session management network element, and obtains, from the unified data repository, the operating system identification information corresponding to the identification information of the terminal device; or the policy control network element obtains a permanent equipment identifier of the terminal device from the unified data repository, and determines the operating system identification information corresponding to the permanent equipment identifier.

According to a second aspect, an embodiment of this application provides a communication method. The communication method includes: A policy control network element obtains operating system identification information of a terminal device; the policy control network element determines an application descriptor based on the operating system identification information, where the application descriptor includes an operating system identifier and an operating system application identifier that are of the terminal device; and the policy control network element sends a PCC rule to a session management network element, where the PCC rule includes the application descriptor, the application descriptor is for generating an ATSSS rule, and the ATSSS rule includes the application descriptor.

Based on the foregoing implementation solution, the policy control network element may determine the application descriptor, and send the application descriptor to the session management network element, so that the session management network element may generate the ATSSS rule based on the application descriptor. In this way, the ATSSS rule is accurately generated, and the method is simple and easy to implement.

In a possible implementation method, that a policy control network element obtains operating system identification information of a terminal device includes: The policy control network element receives the operating system identification information from the session management network element; the policy control network element receives identification information of the terminal device from the session management network element, and obtains, from the unified data repository, the operating system identification information corresponding to the identification information of the terminal device; or the policy control network element obtains a permanent equipment identifier of the terminal device from the unified data repository, and determines the operating system identification information corresponding to the permanent equipment identifier.

According to a third aspect, an embodiment of this application provides a communication method. The communication method includes: A session management network element obtains a PCC rule that includes an application identifier, determines a first application descriptor based on the application identifier, and generates an ATSSS rule according to the PCC rule and the first application descriptor, where the ATSSS rule includes the first application descriptor.

Based on the foregoing implementation solution, the session management network element may obtain, from a policy control network element, the application descriptor for generating the ATSSS rule, and generate the ATSSS rule according to the PCC rule and the application descriptor. In this way, the ATSSS rule is accurately generated, and the method is simple and easy to implement.

In a possible implementation method, the session management network element obtains operating system identification information of a terminal device. That the session management network element determines a first application descriptor based on the application identifier includes: The session management network element determines the first application descriptor based on the operating system identification information and the application identifier, where the first application descriptor includes an operating system identifier and an operating system application identifier that are of the terminal device.

In a possible implementation method, that the session management network element obtains operating system identification information of a terminal device includes: The session management network element receives a session establishment request (for example, a PDU session establishment request) from the terminal device, where the session establishment request includes the operating system identification information; or the session management network element receives a session modification request (for example, a PDU session modification request) from the terminal device, where the session modification request includes the operating system identification information.

In a possible implementation method, that the session management network element determines the first application descriptor based on the operating system identification information and the application identifier includes: The session management network element determines, based on a correspondence among the operating system identification information, the application identifier, and the first application descriptor, the first application descriptor corresponding to the operating system identification information and the application identifier, where the correspondence is stored in the session management network element, a unified data repository, a network exposure function network element, or an application function network element.

In a possible implementation method, that the session management network element determines the first application descriptor based on the operating system identification information and the application identifier includes: The session management network element determines, based on the application identifier, a second application descriptor corresponding to the application identifier; and the session management network element determines, based on the operating system identification information and the second application descriptor, the first application descriptor that is in the second application descriptor and that corresponds to the operating system identification information.

In a possible implementation method, that the session management network element determines a first application descriptor based on the application identifier includes: The session management network element determines, based on a correspondence between the application identifier and the first application descriptor, the first application descriptor corresponding to the application identifier, where the correspondence is stored in the session management network element, a unified data repository, a network exposure function network element, or an application function network element.

According to a fourth aspect, an embodiment of this application provides a communication method. The communication method includes: A session management network element receives, from a policy control network element, an application descriptor corresponding to operating system identification information of a terminal device; and the session management network element generates an ATSSS rule based on the application descriptor, where the ATSSS rule includes the application descriptor.

Based on the foregoing implementation solution, the session management network element may obtain, from the policy control network element, the application descriptor for generating the ATSSS rule, and generate the ATSSS rule based on the application descriptor. In this way, the ATSSS rule is accurately generated, and the method is simple and easy to implement.

In a possible implementation method, that a session management network element receives, from a policy control network element, an application descriptor corresponding to operating system identification information of a terminal device includes: The session management network element receives a PCC rule and first information from the policy control network element, where the PCC rule includes an application identifier, and the first information includes a correspondence between the application identifier and the application descriptor; the session management network element receives a PCC rule from the policy control network element, where the PCC rule includes an application identifier and the application descriptor; or the session management network element receives a PCC rule from the policy control network element, where the PCC rule includes the application descriptor.

In a possible implementation method, the session management network element receives the operating system identification information from the terminal device, and the session management network element sends the operating system identification information to the policy control network element.

According to a fifth aspect, an embodiment of this application provides a communication method. The communication method includes: A terminal device obtains an application detection filter for detecting a data packet generated by an application; the terminal device performs matching on a data packet of a first service by using the application detection filter; and the terminal device performs splitting control on the data packet of the first service according to an ATSSS rule, where the ATSSS rule includes an application identifier, and the application identifier identifies the application detection filter.

Based on the foregoing implementation solution, the terminal device may achieve an objective of splitting control by using the application detection filter.

In a possible implementation method, that a terminal device obtains an application detection filter includes: The terminal device receives the ATSSS rule and the application detection filter from the session management network element, where the ATSSS rule includes an application identifier, and the application identifier identifies the application detection filter; the terminal device receives the ATSSS rule from the session management network element, where the ATSSS rule includes an application identifier and the application detection filter, and the application identifier identifies the application detection filter; the terminal device receives the ATSSS rule from the session management network element, where the ATSSS rule includes the application detection filter; the terminal device receives the ATSSS rule and data packet flow description information from the session management network element, where the ATSSS rule includes a data packet flow description identifier, the data packet flow description identifier identifies the data packet flow description information, and the terminal device generates the application detection filter based on the data packet flow description information; the terminal device receives the ATSSS rule from the session management network element, where the ATSSS rule includes a data packet flow description identifier and data packet flow description information, the data packet flow description identifier identifies the data packet flow description information, and the terminal device generates the application detection filter based on the data packet flow description information; or the terminal device receives the ATSSS rule from the session management network element, where the ATSSS rule includes data packet flow description information, and the terminal device generates the application detection filter based on the data packet flow description information.

According to a sixth aspect, an embodiment of this application provides a communication apparatus. The apparatus may be a policy control network element, or may be a chip used in the policy control network element. The apparatus has a function of implementing the first aspect, the second aspect, the possible implementations of the first aspect, or the possible implementations of the second aspect. The function may be implemented by hardware, or may be implemented by hardware executing corresponding software. The hardware or the software includes one or more modules corresponding to the function.

According to a seventh aspect, an embodiment of this application provides a communication apparatus. The apparatus may be a session management network element, or may be a chip used in the session management network element. The apparatus has a function of implementing the third aspect, the fourth aspect, the possible implementations of the third aspect, or the possible implementations of the fourth aspect. The function may be implemented by hardware, or may be implemented by hardware executing corresponding software. The hardware or the software includes one or more modules corresponding to the function.

According to an eighth aspect, an embodiment of this application provides a communication apparatus. The apparatus may be a terminal device, or may be a chip used in the terminal device. The apparatus has a function of implementing the fifth aspect or the possible implementations of the fifth aspect. The function may be implemented by hardware, or may be implemented by hardware executing corresponding software. The hardware or the software includes one or more modules corresponding to the function.

According to a ninth aspect, an embodiment of this application provides a communication apparatus, including a processor and a memory. The memory is configured to store computer-executable instructions. When the apparatus runs, the processor executes the computer-executable instructions stored in the memory, so that the apparatus performs any method in the first aspect to the fifth aspect or the possible implementations of the first aspect to the fifth aspect.

According to a tenth aspect, an embodiment of this application provides a communication apparatus, including units or means configured to perform the steps of any method in the first aspect to the fifth aspect or the possible implementations of the first aspect to the fifth aspect.

According to an eleventh aspect, an embodiment of this application provides a communication apparatus, including a processor and an interface circuit. The processor is configured to: communicate with another apparatus through the interface circuit, and perform any method in the first aspect to the fifth aspect or the possible implementations of the first aspect to the fifth aspect. There are one or more processors.

According to a twelfth aspect, an embodiment of this application provides a communication apparatus, including a processor. The processor is configured to: be connected to a memory, and invoke a program stored in the memory, to perform any method in the first aspect to the fifth aspect or the possible implementations of the first aspect to the fifth aspect. The memory may be located inside or outside the apparatus. In addition, there are one or more processors.

According to a thirteenth aspect, an embodiment of this application further provides a computer-readable storage medium. The computer-readable storage medium stores instructions. When the instructions are run on a computer, a processor is enabled to perform any method in the first aspect to the fifth aspect or the possible implementations of the first aspect to the fifth aspect.

According to a fourteenth aspect, an embodiment of this application further provides a computer program product. The computer product includes a computer program. When the computer program is run, any method in the first aspect to the fifth aspect or the possible implementations of the first aspect to the fifth aspect is enabled to be performed.

According to a fifteenth aspect, an embodiment of this application further provides a chip system, including a processor. The processor is configured to perform any method in the first aspect to the fifth aspect or the possible implementations of the first aspect to the fifth aspect.

According to a sixteenth aspect, an embodiment of this application further provides a communication system, including a policy control network element and a session management network element. The policy control network element is configured to: obtain an application identifier, determine a first application descriptor based on the application identifier, and send the first application descriptor to the session management network element. The session management network element is configured to: receive the first application descriptor from the policy control network element, and generate an ATSSS rule based on the first application descriptor, where the ATSSS rule includes the first application descriptor.

According to a seventeenth aspect, an embodiment of this application further provides a communication method. The communication method includes: A policy control network element obtains an application identifier, determines a first application descriptor based on the application identifier, and sends the first application descriptor to a session management network element; and the session management network element receives the first application descriptor from the policy control network element, and generates an ATSSS rule based on the first application descriptor, where the ATSSS rule includes the first application descriptor.

According to an eighteenth aspect, an embodiment of this application further provides a communication system, including a policy control network element and a session management network element. The policy control network element is configured to: obtain operating system identification information of a terminal device; determine an application descriptor based on the operating system identification information, where the application descriptor includes an operating system identifier and an operating system application identifier that are of the terminal device; and send a PCC rule to the session management network element, where the PCC rule includes the application descriptor, the application descriptor is for generating an ATSSS rule, and the ATSSS rule includes the application descriptor. The session management network element is configured to: receive the application descriptor from the policy control network element, and generate the ATSSS rule based on the application descriptor, where the ATSSS rule includes the application descriptor.

According to a nineteenth aspect, an embodiment of this application further provides a communication method. The communication method includes: A policy control network element obtains operating system identification information of a terminal device, determines an application descriptor based on the operating system identification information, where the application descriptor includes an operating system identifier and an operating system application identifier that are of the terminal device, and sends a PCC rule to a session management network element, where the PCC rule includes the application descriptor, the application descriptor is for generating an ATSSS rule, and the ATSSS rule includes the application descriptor; and the session management network element receives the application descriptor from the policy control network element, and generates the ATSSS rule based on the application descriptor, where the ATSSS rule includes the application descriptor.

According to a twentieth aspect, an embodiment of this application further provides a communication system, including a session management network element and a policy control network element. The policy control network element is configured to send a PCC rule to the session management network element, where the PCC rule includes an application identifier. The session management network element is configured to: obtain the PCC rule from the policy control network element, determine a first application descriptor based on the application identifier, and generate an ATSSS rule according to the PCC rule and the first application descriptor, where the ATSSS rule includes the first application descriptor.

According to a twenty-first aspect, an embodiment of this application further provides a communication method. The communication method includes: A policy control network element sends a PCC rule to a session management network element, where the PCC rule includes an application identifier; and the session management network element obtains the PCC rule from the policy control network element, determines a first application descriptor based on the application identifier, and generates an ATSSS rule according to the PCC rule and the first application descriptor, where the ATSSS rule includes the first application descriptor.

BRIEF DESCRIPTION OF DRAWINGS

FIG. 3($b$) is a schematic flowchart of another communication method according to this application;

FIG. 3($c$) is a schematic flowchart of another communication method according to this application;

FIG. 3($d$) is a schematic flowchart of another communication method according to this application;

DESCRIPTION OF EMBODIMENTS

Figure 1:
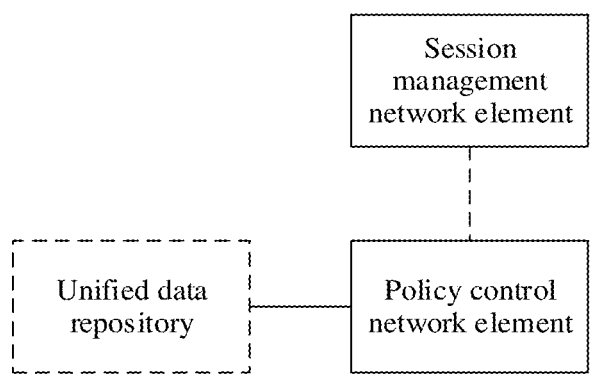
FIG. 1 is a schematic diagram of a communication system according to this application.

To resolve the problem discussed in the background, as shown in FIG. 1, this application provides a communication system. The system includes a policy control network element and a session management network element.

First Embodiment

The policy control network element is configured to: obtain an application identifier, determine a first application descriptor based on the application identifier, and send the first application descriptor to the session management network element. The session management network element is configured to: receive the first application descriptor from the policy control network element, and generate an ATSSS rule based on the first application descriptor, where the ATSSS rule includes the first application descriptor.

In a possible implementation method, that the policy control network element is configured to send the first application descriptor to the session management network element specifically includes: The policy control network element is configured to: send a PCC rule and first information to the session management network element, where the PCC rule includes the application identifier, and the first information includes a correspondence between the application identifier and the first application descriptor, send a PCC rule to the session management network element, where the PCC rule includes the application identifier and the first application descriptor, or send a PCC rule to the session management network element, where the PCC rule includes the first application descriptor.

In a possible implementation method, the policy control network element is further configured to obtain operating system identification information of a terminal device. That the policy control network element is configured to determine a first application descriptor based on the application identifier specifically includes: The policy control network element is configured to determine the first application descriptor based on the operating system identification information and the application identifier, where the first application descriptor includes an operating system identifier and an operating system application identifier that are of the terminal device.

In a possible implementation method, that the policy control network element is configured to determine the first application descriptor based on the operating system identification information and the application identifier specifically includes: The policy control network element is configured to determine, based on a correspondence among the operating system identification information, the application identifier, and the first application descriptor, the first application descriptor corresponding to the operating system identification information and the application identifier, where the correspondence is stored in the policy control network element, a unified data repository, a network exposure function network element, or an application function network element.

In a possible implementation method, that the policy control network element is configured to determine the first application descriptor based on the operating system identification information and the application identifier specifically includes: The policy control network element is configured to: determine, based on the application identifier, a second application descriptor corresponding to the application identifier, and determine, based on the operating system identification information and the second application descriptor, the first application descriptor that is in the second application descriptor and that corresponds to the operating system identification information.

In a possible implementation method, that the policy control network element is configured to obtain operating system identification information of a terminal device specifically includes: The policy control network element is configured to: receive the operating system identification information from the session management network element, receive identification information of the terminal device from the session management network element and obtain, from the unified data repository, the operating system identification information corresponding to the identification information of the terminal device, or obtain a permanent equipment identifier of the terminal device from the unified data repository and determine the operating system identification information corresponding to the permanent equipment identifier.

Second Embodiment

The policy control network element is configured to: obtain operating system identification information of a terminal device, determine an application descriptor based on the operating system identification information, where the application descriptor includes an operating system identifier and an operating system application identifier that are of the terminal device, and send a PCC rule to the session management network element, where the PCC rule includes the application descriptor, the application descriptor is for generating an ATSSS rule, and the ATSSS rule includes the application descriptor. The session management network element is configured to: receive the application descriptor from the policy control network element, and generate the ATSSS rule based on the application descriptor, where the ATSSS rule includes the application descriptor.

In a possible implementation method, that the policy control network element is configured to obtain operating system identification information of a terminal device specifically includes: The policy control network element is configured to: receive the operating system identification information from the session management network element, receive identification information of the terminal device from the session management network element and obtain, from the unified data repository, the operating system identification information corresponding to the identification information of the terminal device, or obtain a permanent equipment identifier of the terminal device from the unified data repository and determine the operating system identification information corresponding to the permanent equipment identifier.

Third Embodiment

The policy control network element is configured to send a PCC rule to the session management network element, where the PCC rule includes an application identifier. The session management network element is configured to: obtain the PCC rule from the policy control network element, determine a first application descriptor based on the application identifier, and generate an ATSSS rule according to the PCC rule and the first application descriptor, where the ATSSS rule includes the first application descriptor.

In a possible implementation method, the session management network element is further configured to obtain operating system identification information of a terminal device. That the session management network element is configured to determine a first application descriptor based on the application identifier specifically includes: The session management network element is configured to determine the first application descriptor based on the operating system identification information and the application identifier, where the first application descriptor includes an operating system identifier and an operating system application identifier that are of the terminal device.

In a possible implementation method, that the session management network element is configured to obtain operating system identification information of a terminal device specifically includes: The session management network element is configured to: receive a session establishment request (for example, a PDU session establishment request) from the terminal device, where the session establishment request includes the operating system identification information, or receive a session modification request (for example, a PDU session modification request) from the terminal device, where the session modification request includes the operating system identification information.

In a possible implementation method, that the session management network element is configured to determine the first application descriptor based on the operating system identification information and the application identifier specifically includes: The session management network element is configured to determine, based on a correspondence among the operating system identification information, the application identifier, and the first application descriptor, the first application descriptor corresponding to the operating system identification information and the application identifier, where the correspondence is stored in the session management network element, a unified data repository, a network exposure function network element, or an application function network element.

In a possible implementation method, that the session management network element is configured to determine the first application descriptor based on the operating system identification information and the application identifier specifically includes: The session management network element is configured to: determine, based on the application identifier, a second application descriptor corresponding to the application identifier, and determine, based on the operating system identification information and the second application descriptor, the first application descriptor that is in the second application descriptor and that corresponds to the operating system identification information.

In a possible implementation method, that the session management network element is configured to determine the first application descriptor based on the operating system identification information and the application identifier specifically includes: The session management network element is configured to determine, based on a correspondence between the application identifier and the first application descriptor, the first application descriptor corresponding to the application identifier, where the correspondence is stored in the session management network element, a unified data repository, a network exposure function network element, or an application function network element.

Specific implementations of the foregoing solutions are described in detail in the following method embodiments. Details are not described herein.

Figure 2:
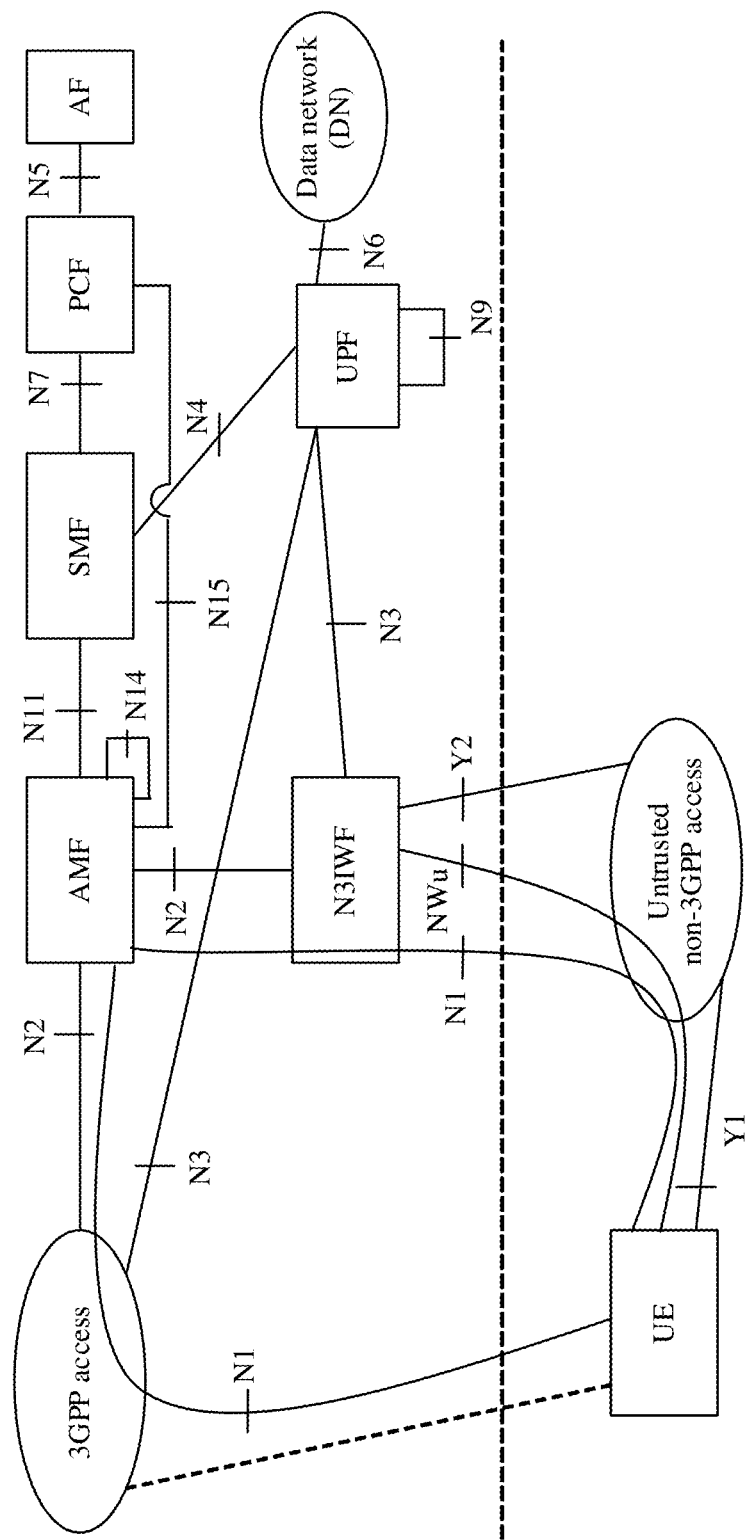
FIG. 2 is a schematic diagram of a 5G network architecture.

The system shown in FIG. 1 may be used in the 5G network architecture shown in FIG. 2, or certainly, may be used in a future network architecture, for example, a 6th generation (6G) network architecture. This is not limited in this application.

For example, it is assumed that the communication system shown in FIG. 1 is used in a 5G network architecture. FIG. 2 is a schematic diagram of a 5G network architecture. The 5G network architecture shown in FIG. 2 may include three parts: a terminal device, a data network (DN), and a carrier network. The following briefly describes functions of some network elements.

The carrier network includes but is not limited to one or more of the following network elements: a policy control function (PCF) network element, an application function (AF) network element, an access and mobility management function (AMF) network element, a session management function (SMF) network element, an access network and user plane function (UPF) network element, a unified data repository (UDR) (not shown in the figure), and the like. In the foregoing carrier network, parts other than an access network may be referred to as core network parts.

During specific implementation, the terminal device in embodiments of this application may be a device configured to implement a wireless communication function. The terminal device may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

The terminal device may establish a connection to the carrier network through an interface (for example, N1) provided by the carrier network, and use services such as a data service and/or a voice service provided by the carrier network. The terminal device may further access the data network through the carrier network, and use a carrier service deployed on the data network and/or a service provided by a third party. The third party may be a service provider other than the carrier network and the terminal device, and may provide services such as a data service and/or a voice service for the terminal device. A specific representation form of the third party may be specifically determined based on an actual application scenario, and is not limited herein.

The access network is a sub-network of the carrier network, and is an implementation system between a service node in the carrier network and the terminal device. To access the carrier network, the terminal device first passes through the access network, and may be connected to the service node in the carrier network through the access network. The access network includes a 3GPP access network and a non-3GPP access network. An access device in the 3GPP access network may be referred to as a radio access network (RAN) device.

The RAN device is a device that provides a wireless communication function for the terminal device. The RAN device includes but is not limited to a next generation NodeB (gNodeB, gNB), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmitting and receiving point (TRP), a transmitting point (transmitting point, TP), a mobile switching center, or the like.

An access device in the non-3GPP access network may be referred to as a non-3GPP interworking function (N3IWF) device. The N3IWF device may include, for example, a router.

The AMF network element is responsible for access and mobility management, termination of an N2 interface, and supports termination of a non-access stratum (NAS), registration management, connection management, reachability management, tracking area list (TA list) allocation, mobility management, transparent routing session management to an SMF, and the like.

The SMF network element is responsible for session management, UE internet protocol (IP) address allocation and management, allocation and selection of a user plane anchor function, (re)selection of the UPF and a user plane path, and the like.

The UPF network element is responsible for functions such as packet routing and forwarding, lawful interception, downlink packet buffering, and downlink data notification triggering.

The AF network element is mainly responsible for transferring of requirements of an application side on a network side, for example, a quality of service (QoS) requirement or user status event subscription. The AF may be a third-party functional entity, or may be an operator-deployed application service, for example, an IP multimedia subsystem (IMS) voice call service.

The PCF network element is mainly responsible for policy and charging control for session and service data flows, QoS bandwidth guarantee, mobility management, UE policy decision, and the like. In this architecture, PCFs connected to the AMF and the SMF are separately an AM PCF (PCF for Access and Mobility Control) and an SM PCF (PCF for Session Management). In an actual deployment scenario, the PCFs may not be a same PCF entity.

The UDR is mainly responsible for storage and retrieval of subscription data, policy data, application data, and other types of data.

The DN is a network outside the carrier network. The carrier network may access a plurality of DNs. A plurality of services may be deployed in the DN, and the DN may provide services such as a data service and/or a voice service for the terminal device. For example, the DN is a private network of a smart factory, a sensor installed in a workshop of the smart factory may be a terminal device, a control server of the sensor is deployed in the DN, and the control server may serve the sensor. The sensor may communicate with the control server, to obtain instructions of the control server, transmit collected sensor data to the control server according to the instructions, and the like. For another example, the DN is an internal office network of a company, a mobile phone or a computer of an employee of the company may be a terminal device, and the mobile phone or the computer of the employee may access information, data resources, and the like in the internal office network of the company.

It may be understood that the foregoing network elements or the functions may be network elements in a hardware device, software functions running on dedicated hardware, or virtualized functions instantiated on a platform (for example, a cloud platform). Optionally, the foregoing network elements or the functions may be implemented by one device, may be implemented by a plurality of devices, or may be one function module in one device. This is not specifically limited in embodiments of this application.

The session management network element and the policy control network element in embodiments of this application may be respectively the SMF and the PCF in FIG. 2, or may be network elements that have functions of the SMF and the PCF in a future communication network, for example, a 6th generation (6G) network. This is not limited in embodiments of this application.

For ease of understanding the solutions of this application, the following first describes some terms in embodiments of this application.

1. Application Descriptor

The application descriptor is an application identifier for identifying an application that generates data flows. The application descriptor includes an operating system identifier (OSid) and an operating system specific application program identifier (OSAppid). In other words, an application descriptor is related to a specific operating system.

The OSid identifies an operating system (OS). The operating system is a set of UE software that provides a common service for applications.

The OSAppid is an identifier associated with a given application and uniquely identifies an application on UE of a given operating system.

It should be noted that, in future standards, a new type of application descriptor may be introduced, for example, may be referred to as a "unified application descriptor". The unified application descriptor includes a character string for describing an application running on the terminal device. The unified application descriptor may be globally unique or unique within a public land mobile network (PLMN), and may be defined by a third party organization (for example, the Global System for Mobile Communications Association, GSMA for short). Therefore, in future standards, the application descriptor may no longer include an OSid and an OSAppid, but instead include a character string for describing an application, meaning that the application descriptor is unrelated to the operating system. In the case in which the unified application descriptor is unrelated to the operating system, in subsequent embodiments of this application, a unified application descriptor corresponding to an application identifier is determined based on a correspondence between the application identifier and the unified application descriptor.

2. Application Identifier (APP ID)

The application identifier is an index of an application detection filter.

3. Application Detection Filter

The application detection filter is logic for detecting, based on extension information, a packet generated by an application. The extension information may be, for example, a header, payload information, and/or a dynamic of a packet flow.

4. Data Packet Flow Description (PFD)

PFD may alternatively be referred to as PFD information. A set of information about application traffic provided by a third-party service provider can be detected based on the PFD. The PFD may be used to generate the application detection filter. The PFD includes the following information:

(1) PFD identifier; and (2) one or more of a 3-tuple, a valid part of a to-be-matched uniform resource locator (URL), a domain name matching criterion, and information about related application protocols.

The 3-tuple includes a protocol, a server-side internet protocol (IP) address, and a port number. The valid part of the to-be-matched URL may be, for example, a host name.

5. Operating System Identification Information

The operating system identification information is information for identifying an operating system of a terminal device. For example, the operating system identification information may be an operating system identifier (OSid), or operating system description information. For ease of description, in the following embodiments of this application, an example in which the operating system identification information is an operating system identifier (OSid) is used for description.

Figure 3A:
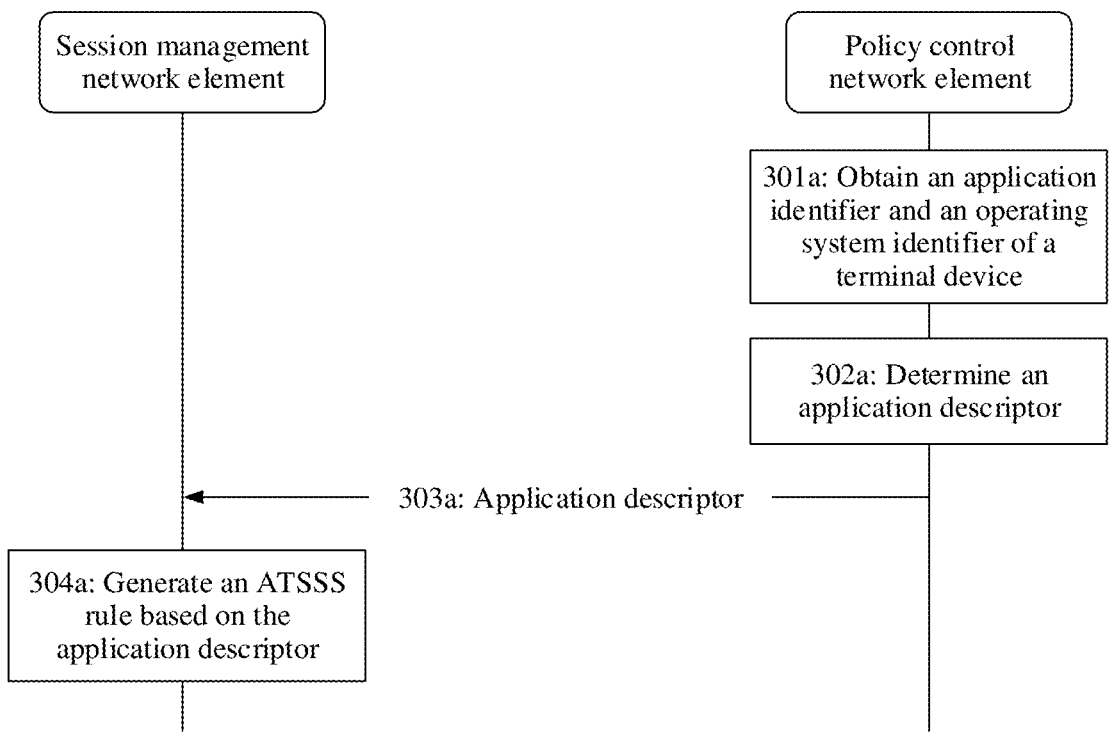
FIG. 3($a$) is a schematic flowchart of a communication method according to this application.

To resolve the problem discussed in the background, as shown in FIG. 3(a), this application provides a communication method based on the network architecture shown in FIG. 2. In the method, a policy control network element determines an application descriptor and sends the application descriptor to a session management network element, and then the session management network element generates an ATSSS rule based on the application descriptor.

The method includes the following steps.

Step 301a: The policy control network element obtains an application identifier (APP ID) and an operating system identifier (OSid) of a terminal device.

A method for obtaining the operating system identifier of the terminal device by the policy control network element includes but is not limited to the following.

Method 1: The policy control network element receives the operating system identifier from the session management network element.

For example, the session management network element may receive the operating system identifier of the terminal device from the terminal device, and then the session management network element sends the operating system identifier of the terminal device to the policy control network element.

For another example, the session management network element may receive a permanent equipment identifier (PEI) of the terminal device from the terminal device or a mobility management network element, and then the session management network element determines the operating system identifier of the terminal device based on the PEI of the terminal device, and sends the operating system identifier of the terminal device to the policy control network element.

Method 2: The policy control network element receives identification information of the terminal device from the session management network element, and obtains, from a unified data repository, the operating system identifier corresponding to the identification information of the terminal device.

For example, the session management network element receives the identification information (for example, a subscription permanent identifier (SUPI)) of the terminal device from the terminal device, and then sends the identification information of the terminal device to the policy control network element. The policy control network element sends the identification information of the terminal device to the unified data repository, and then the unified data repository sends the operating system identifier of the terminal device that corresponds to the identification information of the terminal device to the policy control network element.

Method 3: The policy control network element obtains a permanent equipment identifier of the terminal device from a unified data repository, and determines the operating system identifier corresponding to the permanent equipment identifier.

For example, the session management network element receives identification information (for example, an SUPI) of the terminal device from the terminal device, and then sends the identification information of the terminal device to the policy control network element. The policy control network element sends the identification information of the terminal device to the unified data repository, and then the unified data repository sends the permanent equipment identifier of the terminal device that corresponds to the identification information of the terminal device to the policy control network element. Therefore, the policy control network element determines, based on the permanent equipment identifier of the terminal device, the operating system identifier that corresponds to the permanent equipment identifier of the terminal device and that is stored in the policy control network element.

Step 302a: The policy control network element determines the application descriptor, where the application descriptor includes the operating system identifier (OSid) and an operating system application identifier (OSAppid).

In an implementation method, a correspondence among the application identifier, the OSid, and the application descriptor may be configured in the policy control network element, the unified data repository, a network exposure function (NEF) network element, or an AF network element. Because the application descriptor includes the OSid, a correspondence between the application identifier and the application descriptor may be configured only. Therefore, the policy control network element may locally (namely, from the policy control network element) obtain the application descriptor corresponding to the application identifier and the operating system identifier; or the policy control network element sends the application identifier and the operating system identifier to the unified data repository, the NEF network element, or the AF network element, and then the unified data repository, the NEF network element, or the AF network element sends the application descriptor corresponding to the application identifier and the operating system identifier to the policy control network element. For example, the AF network element stores the foregoing correspondence. The policy control network element may receive a policy authorization request or a policy modification request sent by the AF network element, where the policy authorization request or the policy modification request carries the application identifier and the application descriptor.

In another implementation method, a correspondence among the application identifier, the OSid, and the application descriptor may be configured in the policy control network element, the unified data repository, an NEF network element, or an AF network element; or a correspondence between the application identifier and the application descriptor and a correspondence between the OSid and the application descriptor are configured, where the application descriptor includes the OSid and the OSAppid. Therefore, the policy control network element may first obtain, from the policy control network element, the unified data repository, the NEF network element, or the AF network element based on the application identifier, one or more application descriptors (which may be referred to as one or more second application descriptors) corresponding to the application identifier; and then obtain, from the obtained one or more application descriptors based on the OSid, one application descriptor (which may be referred to as a first application descriptor) corresponding to the OSid. For example, if OSid=1, the OSid included in the obtained first application descriptor is 1.

Step 303a: The policy control network element sends the application descriptor to the session management network element.

In the conventional technology, the policy control network element needs to send a policy and charging control (PCC) rule to the session management network element. The PCC rule includes an application identifier, but does not include an application descriptor. In this embodiment of this application, the policy control network element may send the application descriptor to the session management network element according to the PCC rule.

In an implementation method, the policy control network element sends the PCC rule and first information to the session management network element, where the PCC rule includes the application identifier, and the first information includes the correspondence between the application identifier and the application descriptor. Therefore, the session management network element may obtain, based on the application identifier in the PCC rule and the correspondence that is between the application identifier and the application descriptor and that is in the first information, the application descriptor corresponding to the application identifier in the PCC rule. The application descriptor may be used for generating the ATSSS rule.

In another implementation method, the policy control network element sends the PCC rule to the session management network element, where the PCC rule includes the application identifier and the application descriptor. Therefore, the session management network element may obtain, from the PCC rule, the application descriptor for generating the ATSSS rule.

In another implementation method, the policy control network element sends the PCC rule to the session management network element, where the PCC rule includes the application descriptor. Therefore, the session management network element may obtain, from the PCC rule, the application descriptor for generating the ATSSS rule.

Step 304a: The session management network element generates the ATSSS rule based on the application descriptor, where the ATSSS rule includes the application descriptor.

The session management network element may generate the ATSSS rule based on content and the application descriptor that are in the PCC rule. After generating the ATSSS rule, the session management network element sends the ATSSS rule to the terminal device, and then the terminal device uses the ATSSS rule to control service splitting.

Based on the foregoing implementation solution, the session management network element may obtain, from the policy control network element, the application descriptor for generating the ATSSS rule, and generate the ATSSS rule according to the PCC rule and the application descriptor. In this way, the ATSSS rule is accurately generated, and the method is simple and easy to implement.

In another implementation solution, in the embodiment corresponding to FIG. 3(a), the policy control network element may identify the operating system of the terminal device by using the OSid of the terminal device or other information, such as operating system description information of the terminal device. In this embodiment of this application, the information may be collectively referred to as operating system identification information. In other words, in this embodiment of this application, the terminal device may identify the operating system of the terminal device by using operating system identification information of the terminal device. The operating system identification information includes but is not limited to the OSid and the operating system description information of the terminal device.

In another implementation solution, in the embodiment corresponding to FIG. 3(a), the policy control network element may alternatively not obtain the OSid of the terminal device in step 301a. Accordingly, in step 302a, the policy control network element determines, based on the application identifier, the application descriptor corresponding to the application identifier. One application identifier may have corresponding application descriptors in different operating systems. Accordingly, the application descriptor determined by the policy control network element may include application descriptors corresponding to a same application identifier in different operating systems. For example, an application identifier 1 corresponds to an application descriptor 1 in the Android operating system, and corresponds to an application descriptor 2 in the Apple iOS operating system. Accordingly, the application descriptor determined by the policy control network element based on the application identifier 1 includes the application descriptor 1 and the application descriptor 2. Therefore, in step 303a, the application descriptor sent by the policy control network element to the session management network element includes application descriptors corresponding to a same application identifier in different operating systems. Accordingly, in step 304a, the ATSSS rule generated by the session management network element includes application descriptors corresponding to a same application identifier in different operating systems.

Figure 3B:
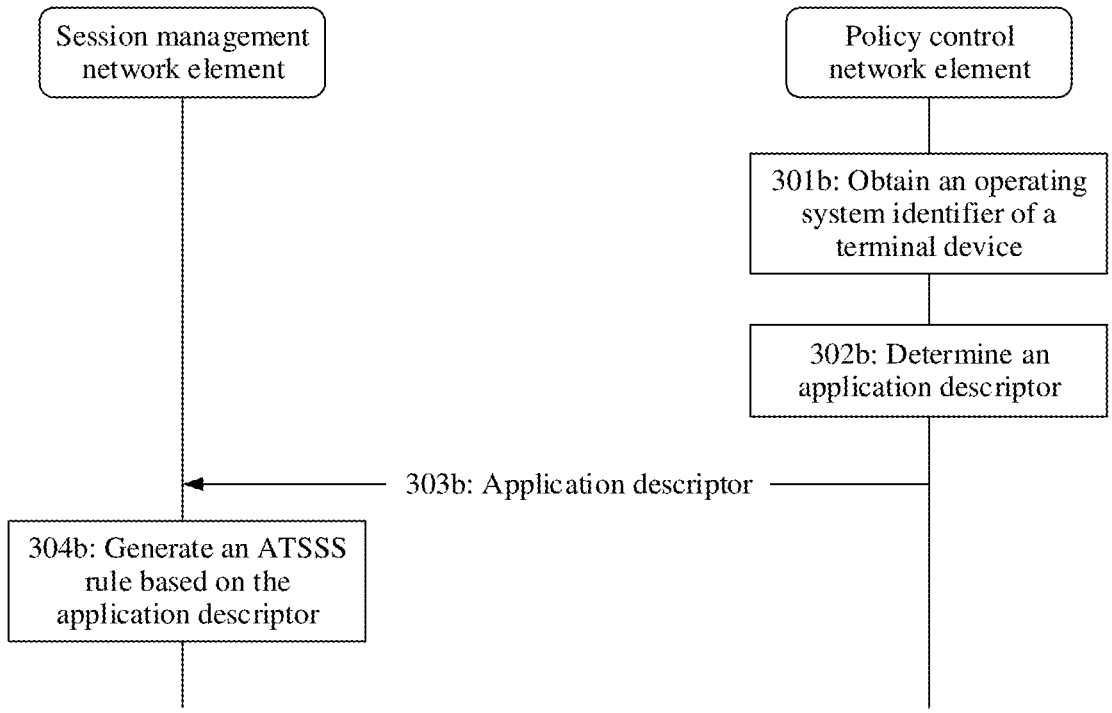

To resolve the problem discussed in the background, as shown in FIG. 3(b), this application provides another communication method based on the network architecture shown in FIG. 2. In the method, a policy control network element determines an application descriptor and sends the application descriptor to a session management network element, and then the session management network element generates an ATSSS rule based on the application descriptor.

The method includes the following steps.

Step 301b: The policy control network element obtains an operating system identifier (OSid) of a terminal device.

A method for obtaining the operating system identifier of the terminal device by the policy control network element is the same as the method for obtaining the operating system identifier of the terminal device by the policy control network element in step 301a. Details are not described again.

Step 302b: The policy control network element determines the application descriptor, where the application descriptor includes the operating system identifier (OSid) and an operating system application identifier (OSAppid).

In an implementation method, a correspondence between an OSid and an application descriptor of each application may be configured in the policy control network element, a unified data repository, an NEF network element, or an AF network element. In other words, each application corresponds to one or more correspondences, and each correspondence is a correspondence between an OSid and an application descriptor. Because the application descriptor includes the OSid, a plurality of application descriptors corresponding to each application may be configured only. Therefore, in step 302b, the policy control network element first determines a current application, and then determines the application descriptor corresponding to the OSid.

Step 303b: The policy control network element sends the application descriptor to the session management network element.

In the conventional technology, the policy control network element needs to send a PCC rule to the session management network element. The PCC rule includes only an application identifier, but does not include an application descriptor. In this embodiment of this application, the policy control network element may send the application descriptor to the session management network element according to the PCC rule. For example, the policy control network element may send the PCC rule to the session management network element, where the PCC rule includes the application descriptor. Therefore, the session management network element may obtain, from the PCC rule, the application descriptor for generating the ATSSS rule.

Step 304b: The session management network element generates the ATSSS rule based on the application descriptor, where the ATSSS rule includes the application descriptor.

The session management network element may generate the ATSSS rule based on content and the application descriptor that are in the PCC rule. After generating the ATSSS rule, the session management network element sends the ATSSS rule to the terminal device, and then the terminal device uses the ATSSS rule to control service splitting.

Based on the foregoing implementation solution, the session management network element may obtain, from the policy control network element, the application descriptor for generating the ATSSS rule, and generate the ATSSS rule according to the PCC rule and the application descriptor. In this way, the ATSSS rule is accurately generated, and the method is simple and easy to implement.

Figure 3C:
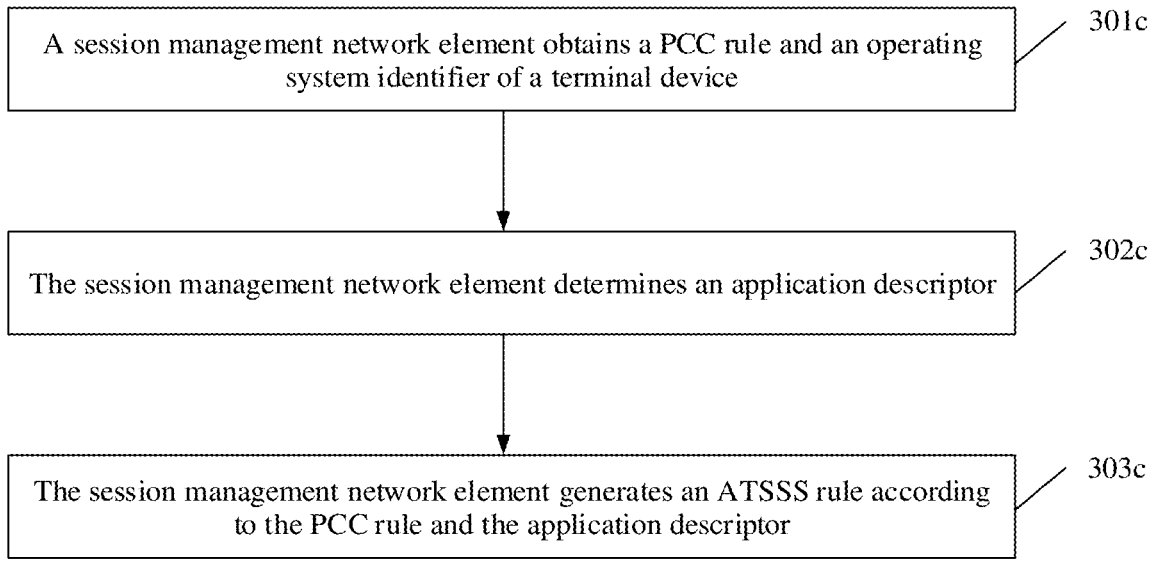

To resolve the problem discussed in the background, as shown in FIG. 3(c), this application provides still another communication method based on the network architecture shown in FIG. 2. In the method, a session management network element determines an application descriptor, and then generates an ATSSS rule based on the application descriptor.

The method includes the following steps.

Step 301c: The session management network element obtains a PCC rule and an operating system identifier (OSid) of a terminal device, where the PCC rule includes an application identifier.

The session management network element may obtain the PCC rule from a policy control network element, where the PCC rule includes the application identifier.

A method for obtaining the operating system identifier of the terminal device by the session management network element includes but is not limited to the following.

Method 1: The session management network element receives a session establishment request (for example, a PDU session establishment request) from the terminal device, where the session establishment request includes the operating system identifier of the terminal device.

Method 2: The session management network element receives a session modification request (for example, a PDU session modification request) from the terminal device, where the session modification request includes the operating system identifier of the terminal device.

Method 3: The session management network element receives a session establishment request (for example, a PDU session establishment request) from the terminal device or a mobility management network element (for example, an AMF), where the session establishment request includes a PEI of the terminal device. The session management network element determines, based on the PEI of the terminal device, the operating system identifier that is of the terminal device and that corresponds to the PEI.

Method 4: The session management network element receives a session modification request (for example, a PDU session modification request) from the terminal device or a mobility management network element (for example, an AMF), where the session modification request includes a PEI of the terminal device. The session management network element determines, based on the PEI of the terminal device, the operating system identifier that is of the terminal device and that corresponds to the PEI.

Step 302c: The session management network element determines the application descriptor.

In an implementation method, a correspondence among the application identifier, the OSid, and the application descriptor may be configured in the session management network element, a unified data repository, an NEF network element, or an AF network element. Because the application descriptor includes the OSid, a correspondence between the application identifier and the application descriptor may be configured only. Therefore, the session management network element may locally (namely, from the session management network element) obtain the application descriptor corresponding to the application identifier and the operating system identifier; or the session management network element sends the application identifier and the operating system identifier to the unified data repository, the NEF network element, or the AF network element, and then the unified data repository, the NEF network element, or the AF network element sends the application descriptor corresponding to the application identifier and the operating system identifier to the session management network element.

In another implementation method, a correspondence among the application identifier, the OSid, and the application descriptor may be configured in the session management network element, a unified data repository, an NEF network element, or an AF network element; or a correspondence between the application identifier and the application descriptor and a correspondence between the OSid and the application descriptor are configured, where the application descriptor includes the OSid and an OSAppid (in other words, the application descriptor may include the correspondence between the OSid and the application descriptor). Therefore, the session management network element may first obtain, from the session management network element, the unified data repository, the NEF network element, or the AF network element based on the application identifier, one or more application descriptors (which may be referred to as one or more second application descriptors) corresponding to the application identifier; and then obtain, from the obtained one or more application descriptors based on the OSid, one application descriptor (which may be referred to as a first application descriptor) corresponding to the OSid. For example, if OSid=1, the OSid included in the obtained first application descriptor is 1.

Step 303c: The session management network element generates the ATSSS rule according to the PCC rule and the application descriptor, where the ATSSS rule includes the application descriptor.

Based on the foregoing implementation solution, the session management network element may obtain, from a policy control network element, the application descriptor for generating the ATSSS rule, and generate the ATSSS rule according to the PCC rule and the application descriptor. In this way, the ATSSS rule is accurately generated, and the method is simple and easy to implement.

In another implementation solution, in the embodiment corresponding to FIG. 3(c), the policy control network element may identify an operating system of the terminal device by using the OSid of the terminal device or other information, such as operating system description information of the terminal device. In this embodiment of this application, the information may be collectively referred to as operating system identification information. In other words, in this embodiment of this application, the terminal device may identify the operating system of the terminal device by using operating system identification information of the terminal device. The operating system identification information includes but is not limited to the OSid and the operating system description information of the terminal device.

In another implementation solution, in the embodiment corresponding to FIG. 3(c), the session management network element may alternatively not obtain the OSid of the terminal device in step 301c. Accordingly, in step 302c, the session management network element determines, based on the application identifier, the application descriptor corresponding to the application identifier. One application identifier may have corresponding application descriptors in different operating systems. Accordingly, the application descriptor determined by the session management network element may include application descriptors corresponding to a same application identifier in different operating systems. For example, an application identifier 1 corresponds to an application descriptor 1 in the Android operating system, and corresponds to an application descriptor 2 in the Apple iOS operating system. Accordingly, the application descriptor determined by the session management network element based on the application identifier 1 includes the application descriptor 1 and the application descriptor 2. Accordingly, in step 303c, the ATSSS rule generated by the session management network element includes application descriptors corresponding to a same application identifier in different operating systems.

Figure 3D:
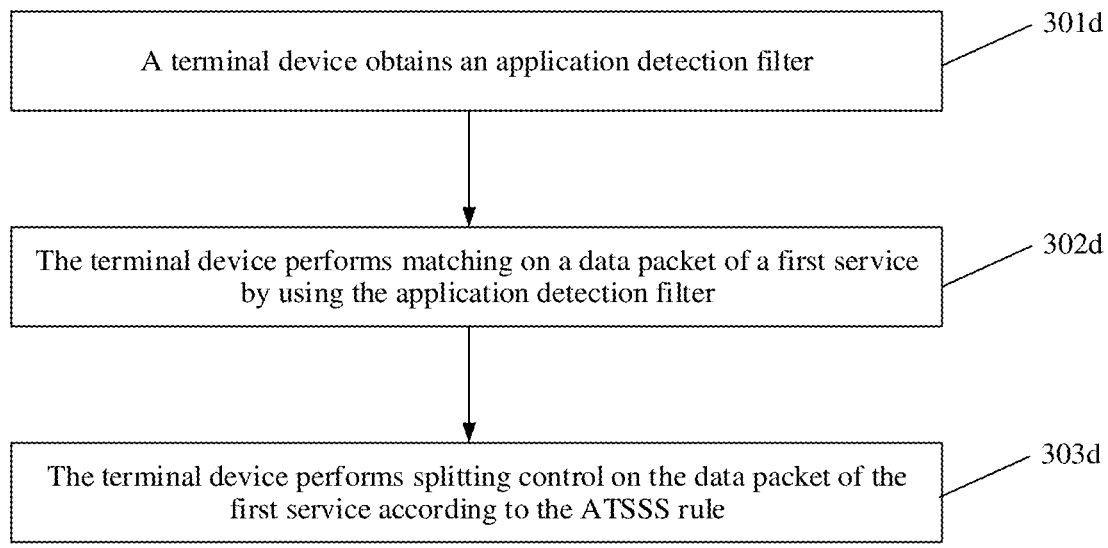

As shown in FIG. 3(d), this application provides yet another communication method based on the network architecture shown in FIG. 2. In the method, a terminal device performs splitting control by using an application detection filter and an ATSSS rule, where the ATSSS rule includes an application identifier. The ATSSS rule is generated by a session management network element.

The method includes the following steps.

Step 301d: The terminal device obtains the application detection filter for detecting a data packet generated by an application.

Because the terminal device may obtain the ATSSS rule from the session management network element, in this embodiment of this application, the terminal device may obtain the application detection filter by using, but not limited to, any one of the following methods in combination with a process of obtaining the ATSSS rule.

Method 1: The terminal device receives the ATSSS rule and the application detection filter from the session management network element, where the ATSSS rule includes the application identifier, and the application identifier identifies the application detection filter.

Method 2: The terminal device receives the ATSSS rule from the session management network element, where the ATSSS rule includes the application identifier and the application detection filter, and the application identifier identifies the application detection filter.

Method 3: The terminal device receives the ATSSS rule from the session management network element, where the ATSSS rule includes the application detection filter.

Method 4: The terminal device receives the ATSSS rule and data packet flow description information from the session management network element, where the ATSSS rule includes a data packet flow description identifier, and the data packet flow description identifier identifies the data packet flow description information; and generates the application detection filter based on the data packet flow description information.

Method 5: The terminal device receives the ATSSS rule from the session management network element, where the ATSSS rule includes a data packet flow description identifier and data packet flow description information, and the data packet flow description identifier identifies the data packet flow description information; and generates the application detection filter based on the data packet flow description information.

Method 6: The terminal device receives the ATSSS rule from the session management network element, where the ATSSS rule includes data packet flow description information; and generates the application detection filter based on the data packet flow description information.

Step 302d: The terminal device performs matching on a data packet of a first service by using the application detection filter.

Step 303d: The terminal device performs splitting control on the data packet of the first service according to the ATSSS rule, where the ATSSS rule includes the application identifier, and the application identifier identifies the application detection filter.

Based on the foregoing implementation solution, the terminal device achieves the objective of splitting control by using the application detection filter. A difference between this embodiment and the embodiments shown in FIG. 3(a) to FIG. 3(c) is: The ATSSS rule generated in this embodiment does not include an application descriptor, and the terminal device performs service splitting by using the application detection filter, while the ATSSS rule generated in the embodiments shown in FIG. 3(a) to FIG. 3(c) include an application descriptor, and the terminal device performs service splitting based on the application descriptor.

The following describes the communication methods shown in FIG. 3(a) to FIG. 3(d) with reference to specific examples.

Figure 4:
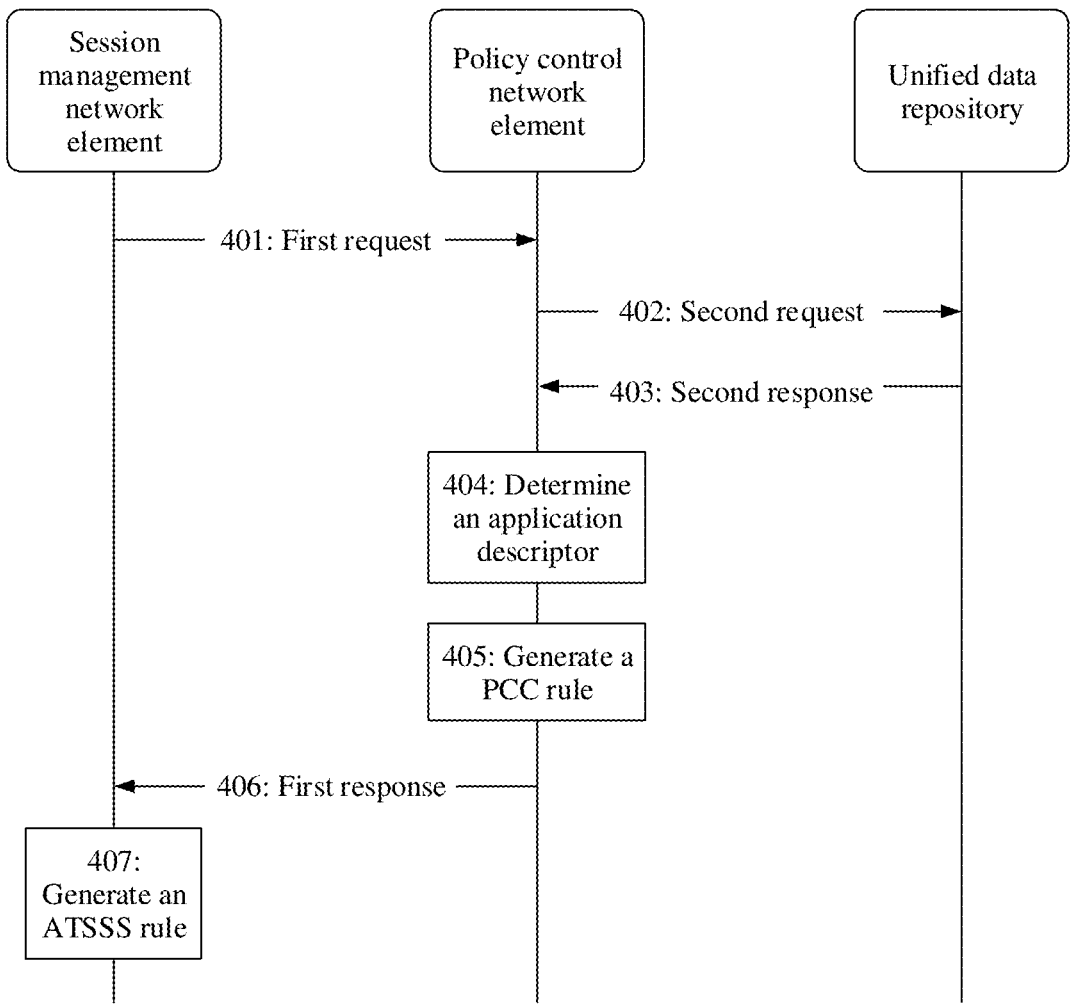
FIG. 4 is a schematic flowchart of another communication method according to this application.
Figure 5:
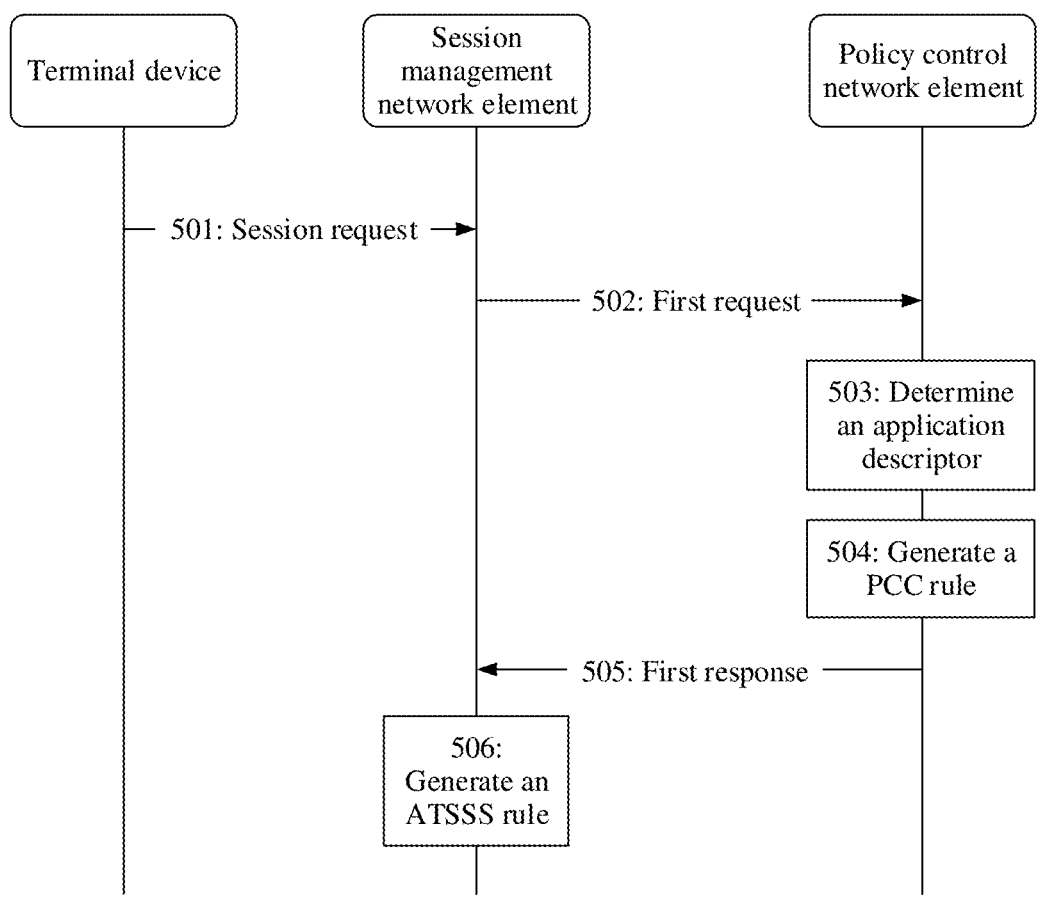
FIG. 5 is a schematic flowchart of another communication method according to this application.
Figure 6:
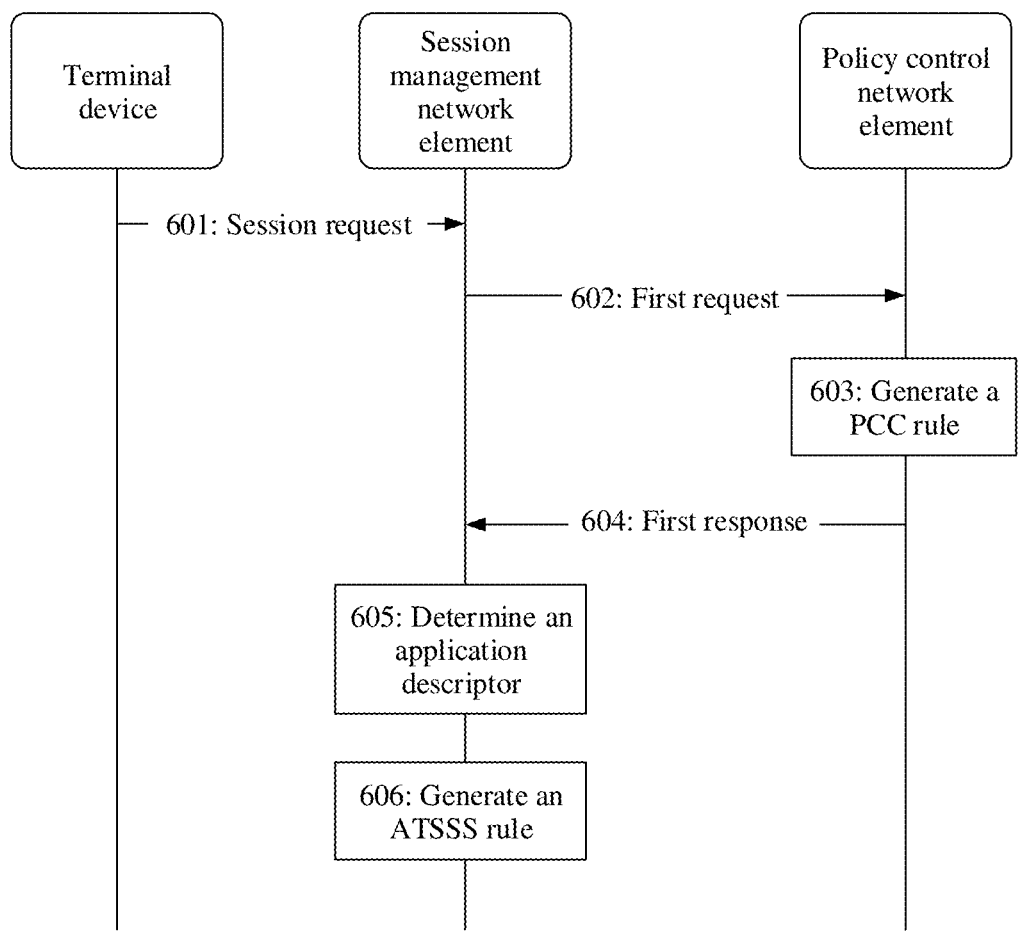
FIG. 6 is a schematic flowchart of another communication method according to this application.
Figure 7:
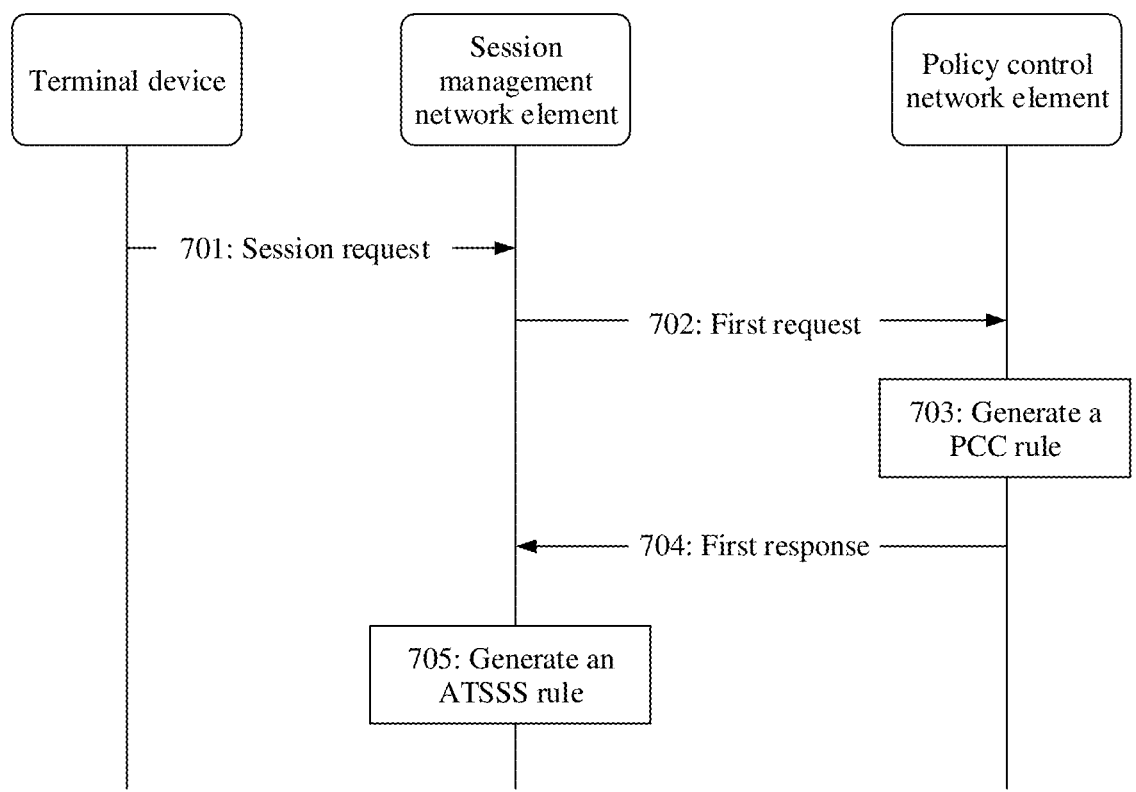
FIG. 7 is a schematic flowchart of another communication method according to this application.

The following embodiment corresponding to FIG. 4 is a specific example of the embodiment corresponding to FIG. 3(a) or FIG. 3(b). The embodiment corresponding to FIG. 5 is also a specific example of the embodiment corresponding to FIG. 3(a) or FIG. 3(b). The embodiment corresponding to FIG. 6 is a specific example of the embodiment corresponding to FIG. 3(c). The embodiment corresponding to FIG. 7 is a specific example of the embodiment corresponding to FIG. 3(d).

FIG. 4 is a schematic diagram of another communication method according to an embodiment of this application. The method includes the following steps.

Step 401: A session management network element sends a first request to a policy control network element. Correspondingly, the policy control network element may receive the first request.

The first request carries identification information of a terminal device, for example, an S UPI.

Step 402: The policy control network element sends a second request to a unified data repository. Correspondingly, the unified data repository may receive the second request.

The second request carries the identification information of the terminal device, and is used to request to obtain an operating system identifier (OSid) of the terminal device, or request to obtain a PEI of the terminal device.

Step 403: The unified data repository sends a second response to the policy control network element. Correspondingly, the policy control network element may receive the second response.

The second response includes the OSid or the PEI of the terminal device.

Step 404: The policy control network element determines an application descriptor.

In a first implementation method, a correspondence among an application identifier, the OSid, and the application descriptor may be configured in the policy control network element, the unified data repository, an NEF network element, or an AF network element. Therefore, in step 404, the policy control network element may locally (namely, from the policy control network element) obtain the application descriptor corresponding to the application identifier and the operating system identifier, or the policy control network element sends the application identifier and the operating system identifier to the unified data repository, the NEF network element, or the AF network element, and then the unified data repository, the NEF network element, or the AF network element sends the application descriptor corresponding to the application identifier and the operating system identifier to the policy control network element. For example, the AF network element stores the foregoing correspondence. The policy control network element may send a policy authorization request or a policy modification request to the AF network element, where the policy authorization request or the policy modification request carries the application identifier and the operating system identifier. Then, the AF network element includes the application descriptor in a policy authorization response or a policy modification response.

Optionally, the foregoing correspondence may be recorded in a manner of a mapping table. For example, the mapping table is shown in Table 1.

TABLE 1

| Application identifier | Operating system identifier (OSid) | Application descriptor |
| --- | --- | --- |
| App ID-1 | OSid-1 | Application Descriptor-1 (OSid-1+ OSAppid-1) |
|  | OSid-2 | Application Descriptor-2 (OSid-2+ OSAppid-2) |
|  | OSid-2 | Application Descriptor-2' (OSid-2+ OSAppid-2) |
| App ID-2 | OSid-1 | Application Descriptor-3 (OSid-1+ OSAppid-3) |
|  | OSid-2 | Application Descriptor-4 (OSid-2+ OSAppid-4) |

Based on Table 1, it can be learned that a same application identifier corresponds to different application descriptors in different operating systems. For example, App ID-2 corresponds to Application Descriptor-3 in an operating system corresponding to OSid-1, and corresponds to Application Descriptor-4 in an operating system corresponding to OSid-2.

A same application identifier may correspond to only one application descriptor in a same operating system. For example, App ID-1 corresponds to Application Descriptor-1 in an operating system corresponding to OSid-1.

Alternatively, a same application identifier may correspond to a plurality of application descriptors in a same operating system. For example, App ID-1 corresponds to Application Descriptor-2 and Application Descriptor-2' in an operating system corresponding to OSid-2. This is because a same application may have a plurality of application markets in a same operating system, and may correspond to different application descriptors in different application markets. For example, a WeChat application corresponds to one application descriptor in a Baidu application market in an Android system, and corresponds to another application descriptor in a 360 application market in the Android system.

If the policy control network element obtains the OSid of the terminal device from the unified data repository in step 403, the policy control network element may determine the application descriptor based on the OSid, the application identifier, and the mapping table in step 404. For example, if the policy control network element obtains that the OSid of the terminal device is OSid-1, and the application identifier includes App ID-1, the policy control network element may determine, based on the foregoing mapping table, that the application descriptor includes Application Descriptor-1.

If the policy control network element obtains the PEI of the terminal device from the unified data repository in step 403, in step 404, the policy control network element may first determine the OSid of the terminal device based on the PEI of the terminal device, and then determine the application descriptor based on the OSid, the application identifier, and the mapping table.

In a second implementation method, a correspondence between an OSid and an application descriptor of each application may be configured in the policy control network element, the unified data repository, an NEF network element, or an AF network element. In other words, each application corresponds to one or more correspondences, and each correspondence is a correspondence between an OSid and an application descriptor. Therefore, in step 404, the policy control network element first determines a current application, and then determines, in one or more correspondences corresponding to the current application, the application descriptor corresponding to the OSid.

Step 405: The policy control network element generates a PCC rule.

In a first implementation method, the PCC rule includes the application identifier but does not include the application descriptor. For example, the PCC rule includes App ID-1.

In a second implementation method, the PCC rule includes the application identifier and the application descriptor. For example, the PCC rule includes App ID-1 and Application Descriptor-1.

In a third implementation method, the PCC rule includes the application descriptor but does not include the application identifier. For example, the PCC rule includes Application Descriptor-1.

In the conventional technology, the PCC rule includes a multi-access PDU session control (MA PDU Session Control) part and a service data flow detection part. In an implementation method, in this embodiment of this application, when the PCC rule carries the application descriptor, the application descriptor may be carried in the MA PDU session control part or the service data flow detection part.

It should be noted that, in actual application, the foregoing step 404 and step 405 may be separately implemented as independent steps, or may be implemented in one step. This is not limited in this application.

Step 406: The policy control network element sends a first response to the session management network element. Correspondingly, the session management network element may receive the first response.

Corresponding to the first implementation method of step 405, in a first implementation method of step 406, the first response includes the PCC rule and first information, the PCC rule includes the application identifier but does not include the application descriptor, and the first information includes a correspondence between the application identifier and the application descriptor. For example, the PCC rule includes App ID-1, and a first correspondence includes Application Descriptor-1 and App ID-1.

Corresponding to the second implementation method of step 405, in a second implementation method of step 406, the first response includes the PCC rule, and the PCC rule includes the application identifier and the application descriptor. For example, the PCC rule includes Application Descriptor-1 and App ID-1.

Corresponding to the third implementation method of step 405, in a third implementation method of step 406, the first response includes the PCC rule, and the PCC rule includes the application descriptor but does not include the application identifier. For example, the PCC rule includes Application Descriptor-1.

Step 407: The session management network element generates an ATSSS rule.

Corresponding to the first implementation method of step 406, in a first implementation method of step 407, the session management network element generates the ATSSS rule according to the PCC rule and the first correspondence, where the ATSSS rule includes the application descriptor.

Corresponding to the second implementation method or the third implementation method of step 406, in a second implementation method of step 407, the session management network element generates the ATSSS rule according to the PCC rule, where the ATSSS rule includes the application descriptor.

After generating the ATSSS rule, the session management network element sends the ATSSS rule to the terminal device, and then the terminal device uses the ATSSS rule to control service splitting.

Based on the foregoing implementation solution, the session management network element may obtain, from the policy control network element, the application descriptor for generating the ATSSS rule, and generate the ATSSS rule according to the PCC rule and the application descriptor. In this way, the ATSSS rule is accurately generated, and the method is simple and easy to implement.

In an alternative implementation solution, step 402 and step 403 may not be performed, and in step 404, the policy control network element obtains all application descriptors that are in operating systems and that correspond to all application identifiers, and sends the application descriptors to the session management network element. Then, the session management network element generates the ATSSS rule according to the PCC rule and the all application descriptors in operating systems, and sends the ATSSS rule to the terminal device. The terminal device selects, from the ATSSS rule, an application descriptor corresponding to an operating system of the terminal device for use. In other words, in the alternative solution, the terminal device selects, from all delivered application descriptors, an application descriptor corresponding to an operating system of the terminal device for use.

In another alternative implementation solution, step 402 and step 403 may not be performed, and in step 404, the policy control network element obtains application descriptors that are in different operating systems and that correspond to the application identifier in the PCC rule, and sends the application descriptors to the session management network element. Then, the session management network element generates the ATSSS rule based on the received application descriptors, and sends the ATSSS rule to the terminal device. The terminal device selects, from the ATSSS rule, an application descriptor corresponding to an operating system of the terminal device for use. In other words, in the alternative solution, the terminal device selects, from all delivered application descriptors, an application descriptor corresponding to an operating system of the terminal device for use.

In an implementation method, in the embodiment corresponding to FIG. 4, in a PDU session establishment process, the first request is a session management policy association (SM Policy Association) establishment request, for example, may be specifically Npcf_SMPolicyControl_Create Request, and the first response is a session management policy association establishment response, for example, may be specifically Npcf_SMPolicyControl_Create Response.

In another implementation method, in the embodiment corresponding to FIG. 4, in a PDU session establishment or modification process, the first request is a session management policy association modification request, for example, may be specifically Npcf_SMPolicyControl_Moidify Request, and the first response is a session management policy association modification response, for example, may be specifically Npcf_SMPolicyControl_Moidify Response.

In an implementation method, the second request is Nudr_DM_Query, and the second response is Nudr_DM_Subscribe.

FIG. 5 is a schematic diagram of another communication method according to an embodiment of this application. The method includes the following steps.

Step 501: A terminal device sends a session request to a session management network element. Correspondingly, the session management network element may receive the session request.

The session request carries an operating system identifier (OSid) of the terminal device.

Step 502: The session management network element sends a first request to a policy control network element. Correspondingly, the policy control network element may receive the first request.

The first request carries an operating system identifier (OSid) of the terminal device.

Step 503 to step 506 are the same as step 404 to step 407 in the embodiment in FIG. 4.

After generating the ATSSS rule, the session management network element sends the ATSSS rule to the terminal device, and then the terminal device uses the ATSSS rule to control service splitting.

Based on the foregoing implementation solution, the session management network element may obtain, from the policy control network element, the application descriptor for generating the ATSSS rule, and generate the ATSSS rule according to the PCC rule and the application descriptor. In this way, the ATSSS rule is accurately generated, and the method is simple and easy to implement. A main difference between the embodiment corresponding to FIG. 5 and the embodiment corresponding to FIG. 4 is: In the embodiment corresponding to FIG. 5, the OSid obtained by the policy control network element is from the terminal device, while in the embodiment corresponding to FIG. 4, the OSid obtained by the policy control network element is from the unified data repository.

In an alternative implementation solution, the OSid of the terminal device is not carried in step 501 and step 502, and in step 504, the policy control network element obtains all application descriptors that are in operating systems and that correspond to all application identifiers, and sends the application descriptors to the session management network element. Then, the session management network element generates the ATSSS rule according to the PCC rule and the all application descriptors in operating systems, and sends the ATSSS rule to the terminal device. The terminal device selects, from the ATSSS rule, an application descriptor corresponding to an operating system of the terminal device for use. In other words, in the alternative solution, the terminal device selects, from all delivered application descriptors, an application descriptor corresponding to an operating system of the terminal device for use.

In another alternative implementation solution, the OSid of the terminal device is not carried in step 501 and step 502, and in step 504, the policy control network element obtains all application descriptors that are in operating systems and that correspond to the application identifier in the PCC rule, and sends the application descriptors to the session management network element. Then, the session management network element generates the ATSSS rule based on the received application descriptors, and sends the ATSSS rule to the terminal device. The terminal device selects, from the ATSSS rule, an application descriptor corresponding to an operating system of the terminal device for use. In other words, in the alternative solution, the terminal device selects, from all delivered application descriptors, an application descriptor corresponding to an operating system of the terminal device for use.

In an implementation method, in the embodiment corresponding to FIG. 5, in a PDU session establishment process, the session request is a PDU session establishment request, the first request is a session management policy association establishment request, for example, may be specifically Npcf_SMPolicyControl_Create Request, and the first response is a session management policy association establishment response, for example, may be specifically Npcf_SMPolicyControl_Create Response.

In an implementation method, in the embodiment corresponding to FIG. 5, in a PDU session establishment process, the session request is a PDU session establishment request, the first request is a session management policy association modification request, for example, may be specifically Npcf_SMPolicyControl_Moidify Request, and the first response is a session management policy association modification response, for example, may be specifically Npcf_SMPolicyControl_Moidify Response.

In another implementation method, in the embodiment corresponding to FIG. 5, in a PDU session modification process, the session request is a PDU session modification request, the first request is a session management policy association modification request, for example, may be specifically Npcf_SMPolicyControl_Moidify Request, and the first response is a session management policy association modification response, for example, may be specifically Npcf_SMPolicyControl_Moidify Response.

FIG. 6 is a schematic diagram of another communication method according to an embodiment of this application. The method includes the following steps.

Step 601: A terminal device sends a session request to a session management network element. Correspondingly, the session management network element may receive the session request.

In an implementation method, the session request carries an operating system identifier (OSid) of the terminal device.

In another implementation method, the session request carries a PEI of the terminal device, so that the session management network element determines, based on the PEI of the terminal device, an OSid of the terminal device corresponding to the PEI.

In still another implementation method, the session management network element may obtain a PEI of the terminal device from a mobility management network element, and then determine, based on the PEI of the terminal device, an OSid of the terminal device corresponding to the PEI.

Step 602: The session management network element sends a first request to a policy control network element. Correspondingly, the policy control network element may receive the first request.

Step 603: The policy control network element generates a PCC rule.

This step is the same as that in the conventional technology, and the generated PCC rule includes an application identifier.

Step 604: The policy control network element sends a first response to the session management network element. Correspondingly, the session management network element may receive the first response.

The first response includes the PCC rule, and the PCC rule includes the application identifier.

Step 605: The session management network element determines an application descriptor based on the application identifier and the operating system identifier.

In an implementation method, a correspondence among the application identifier, the OSid, and the application descriptor may be configured in the session management network element, a unified data repository, an NEF network element, or an AF network element. Because the application descriptor includes the OSid, a correspondence between the application identifier and the application descriptor may be configured only. Therefore, the session management network element may locally (namely, from the session management network element) obtain the application descriptor corresponding to the application identifier and the operating system identifier; or the session management network element sends the application identifier and the operating system identifier to the unified data repository, the NEF network element, or the AF network element, and then the unified data repository, the NEF network element, or the AF network element sends the application descriptor corresponding to the application identifier and the operating system identifier to the session management network element.

Step 606: The session management network element generates an ATSSS rule.

The session management network element generates the ATSSS rule according to the PCC rule and the application descriptor, where the ATSSS rule includes the application descriptor.

After generating the ATSSS rule, the session management network element sends the ATSSS rule to the terminal device, and then the terminal device uses the ATSSS rule to control service splitting.

Based on the foregoing implementation solution, the session management network element may locally obtain the application descriptor for generating the ATSSS rule, and generate the ATSSS rule according to the PCC rule and the application descriptor. In this way, the ATSSS rule is accurately generated, and the method is simple and easy to implement. A main difference between the embodiment corresponding to FIG. 6 and the embodiment corresponding to FIG. 5 is: In the embodiment corresponding to FIG. 6, the session management network element determines the application descriptor, while in the embodiment corresponding to FIG. 5, the policy control network element determines the application descriptor.

In an alternative implementation solution, the OSid or the PEI of the terminal device is not carried in step 601 and step 602, and in step 605, the session management network element obtains all application descriptors that are in operating systems and that correspond to all application identifiers. Then, the session management network element generates the ATSSS rule according to the PCC rule and the all application descriptors in operating systems, and sends the ATSSS rule to the terminal device. The terminal device selects, from the ATSSS rule, an application descriptor corresponding to an operating system of the terminal device for use. In other words, in the alternative solution, the terminal device selects, from all delivered application descriptors, an application descriptor corresponding to an operating system of the terminal device for use.

In another alternative implementation solution, the OSid or the PEI of the terminal device is not carried in step 601 and step 602, and in step 605, the session management network element obtains application descriptors that are in different operating systems and that correspond to the application identifier in the PCC rule. Then, the session management network element generates the ATSSS rule based on the obtained application descriptors, and sends the ATSSS rule to the terminal device. The terminal device selects, from the ATSSS rule, an application descriptor corresponding to an operating system of the terminal device for use. In other words, in the alternative solution, the terminal device selects, from all delivered application descriptors, an application descriptor corresponding to an operating system of the terminal device for use.

In an implementation method, in the embodiment corresponding to FIG. 6, in a PDU session establishment process, the session request is a PDU session establishment request, the first request is a session management policy association establishment request, for example, may be specifically Npcf_SMPolicyControl_Create Request, and the first response is a session management policy association establishment response, for example, may be specifically Npcf_SMPolicyControl_Create Response.

In an implementation method, in the embodiment corresponding to FIG. 6, in a PDU session establishment process, the session request is a PDU session establishment request, the first request is a session management policy association modification request, for example, may be specifically Npcf_SMPolicyControl_Moidify Request, and the first response is a session management policy association modification response, for example, may be specifically Npcf_SMPolicyControl_Moidify Response.

In another implementation method, in the embodiment corresponding to FIG. 6, in a PDU session modification process, the session request is a PDU session modification request, the first request is a session management policy association modification request, for example, may be specifically Npcf_SMPolicyControl_Moidify Request, and the first response is a session management policy association modification response, for example, may be specifically Npcf_SMPolicyControl_Moidify Response.

FIG. 7 is a schematic diagram of another communication method according to an embodiment of this application. The method includes the following steps.

Step 701: A terminal device sends a session request to a session management network element. Correspondingly, the session management network element may receive the session request.

Step 702: The session management network element sends a first request to a policy control network element. Correspondingly, the policy control network element may receive the first request.

Step 703: The policy control network element generates a PCC rule.

This step is the same as that in the conventional technology, and the generated PCC rule includes an application identifier.

Step 704: The policy control network element sends a first response to the session management network element. Correspondingly, the session management network element may receive the first response.

The first response includes the PCC rule, and the PCC rule includes the application identifier.

Step 705: The session management network element generates an ATSSS rule.

The session management network element generates the ATSSS rule according to the PCC rule, and then sends the ATSSS rule to the terminal device. The terminal device uses the ATSSS rule to control service splitting.

The following provides six specific implementation methods in which the session management network element sends the ATSSS rule to the terminal device, and content included in the ATSSS rule in each implementation method.

Method 1: The session management network element sends the ATSSS rule and an application detection filter to the terminal device, where the ATSSS rule includes the application identifier, and the application identifier identifies the application detection filter.

The session management network element may obtain, from a unified data repository or another network element based on the application identifier, the application detection filter corresponding to the application identifier.

The session management network element may send the ATSSS rule and the application detection filter to the terminal device in a same message. Alternatively, the ATSSS rule and the application detection filter may be separately sent to the terminal device in different messages. For example, the application detection filter may be carried in a UE configuration update command and sent to the terminal device.

Method 2: The session management network element sends the ATSSS rule to the terminal device, where the ATSSS rule includes the application identifier and an application detection filter, and the application identifier identifies the application detection filter.

Method 3: The session management network element sends the ATSSS rule to the terminal device, where the ATSSS rule includes an application detection filter.

Based on the foregoing Method 1, Method 2, or Method 3, after obtaining the application detection filter, the terminal device may detect a corresponding data packet by using the application detection filter, and execute the ATSSS rule on the data packet.

Method 4: The session management network element sends the ATSSS rule and data packet flow description information to the terminal device, where the ATSSS rule includes a PFD identifier (PFD ID), and the PFD ID identifies the data packet flow description information.

A data packet flow description (PFD) includes the PFD ID and the data packet flow description information. The data packet flow description information includes one or more items of a 3-tuple, a valid part of a to-be-matched URL, a domain name matching criterion, and information about related application protocols.

The session management network element may send the ATSSS rule and the data packet flow description information to the terminal device in a same message. Alternatively, the ATSSS rule and the data packet flow description information may be separately sent to the terminal device in different messages.

The session management network element may obtain, from a unified data repository or another network element based on the PFD ID, the data packet flow description information corresponding to the PFD ID.

Method 5: The session management network element sends the ATSSS rule to the terminal device, where the ATSSS rule includes a PFD ID and data packet flow description information, and the PFD ID identifies the data packet flow description information.

Method 6: The session management network element sends the ATSSS rule to the terminal device, where the ATSSS rule includes data packet flow description information.

Based on the foregoing Method 4, Method 5, or Method 6, after receiving the data packet flow description information, the terminal device may generate an application detection filter based on the data packet flow description information, perform matching on a data packet of a first service by using the application detection filter, and then perform splitting control on the data packet of the first service according to the ATSSS rule.

Based on the foregoing Method 4, Method 5, or Method 6, the ATSSS rule may further include the application identifier, where the application identifier identifies the application detection filter.

Based on the foregoing implementation solution, the session management network element generates the ATSSS rule according to the PCC rule. The ATSSS rule does not include an application descriptor, but includes one or more of the application identifier, the application detection filter, the PFD ID, and the data packet flow description information. In this way, the ATSSS rule is accurately generated, and the method is simple and easy to implement. A main difference between the embodiment corresponding to FIG. 7 and the embodiments corresponding to FIG. 4 to FIG. 6 is: The ATSSS rule generated in the embodiment corresponding to FIG. 7 does not include an application descriptor, and the terminal device performs service splitting by using the application detection filter, while the ATSSS rule generated in the embodiments corresponding to FIG. 4 to FIG. 6 includes an application descriptor, and the terminal device performs service splitting based on the application descriptor.

In an implementation method, in the embodiment corresponding to FIG. 7, when a PDU session is established, the session request is a PDU session establishment request, the first request is a session management policy association establishment request, for example, may be specifically Npcf_SMPolicyControl_Create Request, and the first response is a session management policy association establishment response, for example, may be specifically Npcf_SMPolicyControl_Create Response.

In an implementation method, in the embodiment corresponding to FIG. 7, when a PDU session is established, the session request is a PDU session establishment request, the first request is a session management policy association modification request, for example, may be specifically Npcf_SMPolicyControl_Moidify Request, and the first response is a session management policy association modification response, for example, may be specifically Npcf_SMPolicyControl_Moidify Response.

In another implementation method, in the embodiment corresponding to FIG. 7, when a PDU session is modified, the session request is a PDU session modification request, the first request is a session management policy association modification request, for example, may be specifically Npcf_SMPolicyControl_Moidify Request, and the first response is a session management policy association modification response, for example, may be specifically Npcf_SMPolicyControl_Moidify Response.

The foregoing mainly describes the solutions provided in this application from a perspective of interaction between network elements. It may be understood that, to implement the foregoing functions, each network element includes a corresponding hardware structure and/or software module for implementing each function. A person skilled in the art should easily be aware that, in combination with the example units and algorithm steps described in embodiments disclosed in this specification, the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

It may be understood that in the foregoing method embodiments, corresponding steps or operations implemented by the policy control network element may alternatively be implemented by a component (for example, a chip or a circuit) configured in the policy control network element, corresponding steps or operations implemented by the session management network element may alternatively be implemented by a component (for example, a chip or a circuit) configured in the session management network element, and corresponding steps or operations implemented by the terminal device may alternatively be implemented by a component (for example, a chip or a circuit) configured in the terminal device.

Figure 8:
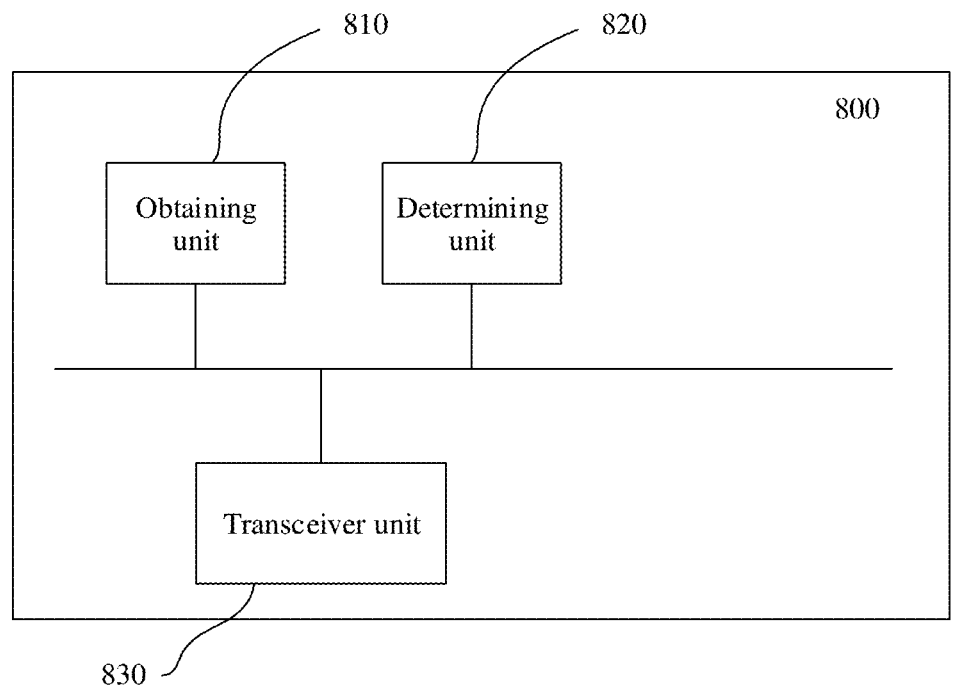
FIG. 8 is a schematic diagram of a communication apparatus according to this application.

FIG. 8 is a schematic diagram of a communication apparatus according to an embodiment of this application. The apparatus is configured to implement the corresponding steps performed by the policy control network element in the embodiment in FIG. 3(*a*), FIG. 3(*b*), FIG. 4, or FIG. 5. As shown in FIG. 8, the apparatus 800 includes an obtaining unit 810, a determining unit 820, and a transceiver unit 830.

First Embodiment

The obtaining unit 810 is configured to obtain an application identifier. The determining unit 820 is configured to determine a first application descriptor based on the application identifier. The transceiver unit 830 is configured to send the first application descriptor to a session management network element, where the first application descriptor is for generating an ATSSS rule, and the ATSSS rule includes the first application descriptor.

In a possible implementation method, the transceiver unit 830 is specifically configured to: send a PCC rule and first information to the session management network element, where the PCC rule includes the application identifier, and the first information includes a correspondence between the application identifier and the first application descriptor; send a PCC rule to the session management network element, where the PCC rule includes the application identifier and the first application descriptor; or send a PCC rule to the session management network element, where the PCC rule includes the first application descriptor.

In a possible implementation method, the obtaining unit 810 is further configured to obtain operating system identification information of a terminal device. The determining unit 820 is specifically configured to determine the first application descriptor based on the operating system identification information and the application identifier, where the first application descriptor includes an operating system identifier and an operating system application identifier that are of the terminal device.

In a possible implementation method, the determining unit 820 is specifically configured to determine, based on a correspondence among the operating system identification information, the application identifier, and the first application descriptor, the first application descriptor corresponding to the operating system identification information and the application identifier, where the correspondence is stored in the policy control network element, a unified data repository, a network exposure function network element, or an application function network element.

In a possible implementation method, the determining unit 820 is specifically configured to: determine, based on the application identifier, a second application descriptor corresponding to the application identifier; and determine, based on the operating system identification information and the second application descriptor, the first application descriptor that is in the second application descriptor and that corresponds to the operating system identification information.

In a possible implementation method, the obtaining unit 810 is specifically configured to: receive the operating system identification information from the session management network element via the transceiver unit 830; receive identification information of the terminal device from the session management network element via the transceiver unit 830, and obtain, from the unified data repository, the operating system identification information corresponding to the identification information of the terminal device; or obtain a permanent equipment identifier of the terminal device from the unified data repository via the transceiver unit 830, and determine the operating system identification information corresponding to the permanent equipment identifier.

Second Embodiment

The obtaining unit 810 is configured to obtain operating system identification information of a terminal device. The determining unit 820 is configured to determine an application descriptor based on the operating system identification information, where the application descriptor includes an operating system identifier and an operating system application identifier that are of the terminal device. The transceiver unit 830 is configured to send a PCC rule to a session management network element, where the PCC rule includes the application descriptor, the application descriptor is for generating an ATSSS rule, and the ATSSS rule includes the application descriptor.

In a possible implementation method, the obtaining unit 810 is specifically configured to: receive the operating system identification information from the session management network element via the transceiver unit 830; receive identification information of the terminal device from the session management network element via the transceiver unit 830, and obtain, from the unified data repository, the operating system identification information corresponding to the identification information of the terminal device; or obtain a permanent equipment identifier of the terminal device from the unified data repository via the transceiver unit 830, and determine the operating system identification information corresponding to the permanent equipment identifier.

Optionally, the communication apparatus 800 may further include a storage unit. The storage unit is configured to store data or instructions (which may also be referred to as code or a program). The foregoing units may interact with or be coupled to the storage unit, to implement a corresponding method or function. For example, a processing unit may read the data or the instructions in the storage unit, so that the communication apparatus implements the methods in the foregoing embodiments.

It should be understood that division into the units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, the units may be separately disposed processing elements, or may be integrated into a chip of the apparatus for implementation. In addition, the units may be stored in a memory in a program form, and is invoked by a processing element of the apparatus to perform functions of the units. In addition, all or some of the units may be integrated together, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, a unit in any one of the foregoing apparatuses may be one or more integrated circuits configured to implement the foregoing methods, for example, one or more application specific integrated circuits (ASICs), one or more microprocessors (DSPs), one or more field programmable gate arrays (FPGAs), or a combination of at least two of these integrated circuit forms. For another example, when the units in the apparatus may be implemented in a form in which a processing element invokes a program, the processing element may be a general-purpose processor, for example, a central processing unit (CPU) or another processor that can invoke the program. For still another example, the units may be integrated and implemented in a form of a system-on-a-chip (SOC).

The transceiver unit is an interface circuit of the apparatus, and is configured to receive a signal from another apparatus. For example, when the apparatus is implemented in a manner of a chip, the transceiver unit is an interface circuit that is of the chip and that is configured to receive and send a signal from another chip or apparatus.

Figure 9:
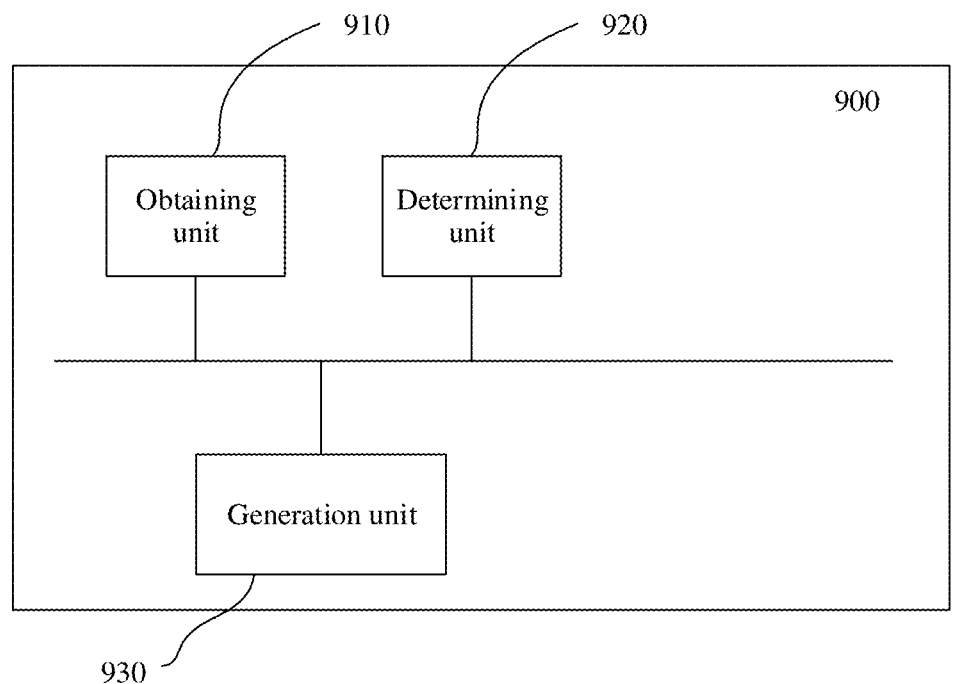
FIG. 9 is a schematic diagram of another communication apparatus according to this application.

FIG. 9 is a schematic diagram of another communication apparatus according to an embodiment of this application. The apparatus is configured to implement the corresponding steps performed by the session management network element in the embodiment in FIG. 3(*c*) or FIG. 6. As shown in FIG. 9, the apparatus 900 includes an obtaining unit 910, a determining unit 920, and a generation unit 930.

The obtaining unit 910 is configured to obtain a PCC rule, where the PCC rule includes an application identifier. The determining unit 920 is configured to determine a first application descriptor based on the application identifier. The generation unit 930 is configured to generate an ATSSS rule according to the PCC rule and the first application descriptor, where the ATSSS rule includes the first application descriptor.

In a possible implementation method, the obtaining unit 910 is further configured to obtain operating system identification information of a terminal device. The determining unit 920 is specifically configured to determine the first application descriptor based on the operating system identification information and the application identifier, where the first application descriptor includes an operating system identifier and an operating system application identifier that are of the terminal device.

In a possible implementation method, the obtaining unit 910 is specifically configured to: receive a session establishment request from the terminal device via a transceiver unit, where the session establishment request includes the operating system identification information; or receive a session modification request from the terminal device via a transceiver unit, where the session modification request includes the operating system identification information.

In a possible implementation method, the determining unit 920 is specifically configured to determine, based on a correspondence among the operating system identification information, the application identifier, and the first application descriptor, the first application descriptor corresponding to the operating system identification information and the application identifier, where the correspondence is stored in the session management network element, a unified data repository, a network exposure function network element, or an application function network element.

In a possible implementation method, the determining unit 920 is specifically configured to: determine, based on the application identifier, a second application descriptor corresponding to the application identifier; and determine, based on the operating system identification information and the second application descriptor, the first application descriptor that is in the second application descriptor and that corresponds to the operating system identification information.

In a possible implementation method, the determining unit 920 is specifically configured to determine, based on a correspondence between the application identifier and the first application descriptor, the first application descriptor corresponding to the application identifier, where the correspondence is stored in the session management network element, a unified data repository, a network exposure function network element, or an application function network element.

Optionally, the communication apparatus 900 may further include a storage unit. The storage unit is configured to store data or instructions (which may also be referred to as code or a program). The foregoing units may interact with or be coupled to the storage unit, to implement a corresponding method or function. For example, a processing unit may read the data or the instructions in the storage unit, so that the communication apparatus implements the methods in the foregoing embodiments.

It should be understood that division into the units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, the units may be separately disposed processing elements, or may be integrated into a chip of the apparatus for implementation. In addition, the units may be stored in a memory in a program form, and is invoked by a processing element of the apparatus to perform functions of the units. In addition, all or some of the units may be integrated together, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, the units in any one of the foregoing apparatuses may be one or more integrated circuits configured to implement the foregoing method, for example, one or more application-specific integrated circuits (ASICs), one or more microprocessors (DSPs), one or more field programmable gate arrays (FPGAs), or a combination of at least two of these integrated circuit forms. For another example, when the units in the apparatus may be implemented in a form in which a processing element invokes a program, the processing element may be a general-purpose processor, for example, a central processing unit (CPU) or another processor that can invoke the program. For another example, these units may be integrated together and implemented in a form of a system-on-a-chip (SOC).

The transceiver unit is an interface circuit of the apparatus, and is configured to receive a signal from another apparatus. For example, when the apparatus is implemented in a manner of a chip, the transceiver unit is an interface circuit that is of the chip and that is configured to receive and send a signal from another chip or apparatus.

Figure 10:
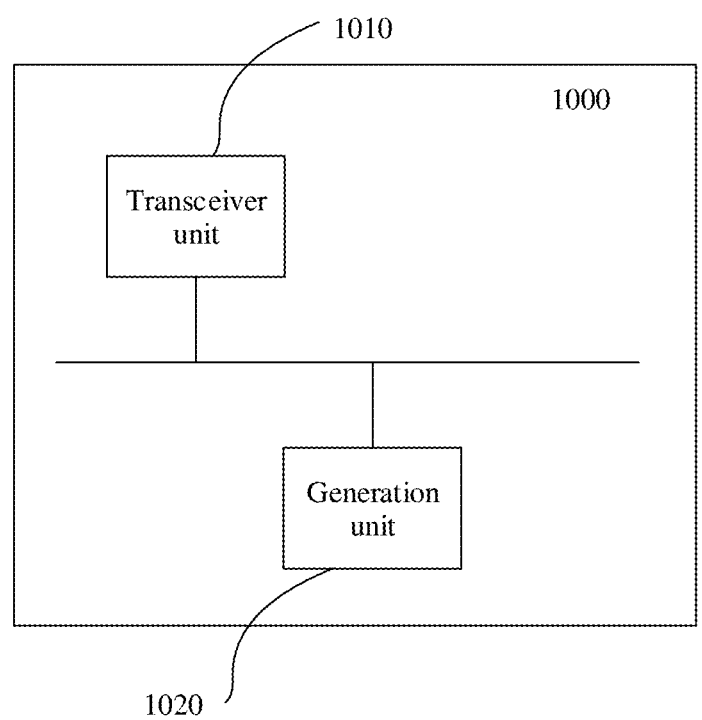
FIG. 10 is a schematic diagram of another communication apparatus according to this application.

FIG. 10 is a schematic diagram of another communication apparatus according to an embodiment of this application. The apparatus is configured to implement the corresponding steps performed by the session management network element in the embodiment in FIG. 3(*a*), FIG. 3(*b*), FIG. 4, or FIG. 5. As shown in FIG. 10, the apparatus 1000 includes a transceiver unit 1010 and a generation unit 1020.

The transceiver unit 1010 is configured to receive, from a policy control network element, an application descriptor corresponding to operating system identification information of a terminal device. The generation unit 1020 is configured to generate an ATSSS rule based on the application descriptor, where the ATSSS rule includes the application descriptor.

In a possible implementation method, the transceiver unit 1010 is specifically configured to: receive a PCC rule and first information from the policy control network element, where the PCC rule includes an application identifier, and the first information includes a correspondence between the application identifier and the application descriptor; receive a PCC rule from the policy control network element, where the PCC rule includes an application identifier and the application descriptor; or receive a PCC rule from the policy control network element, where the PCC rule includes the application descriptor.

In a possible implementation method, the transceiver unit 1010 is further configured to: receive the operating system identification information from the terminal device; and send the operating system identification information to the policy control network element.

Optionally, the communication apparatus 1000 may further include a storage unit. The storage unit is configured to store data or instructions (which may also be referred to as code or a program). The foregoing units may interact with or be coupled to the storage unit, to implement a corresponding method or function. For example, a processing unit may read the data or the instructions in the storage unit, so that the communication apparatus implements the methods in the foregoing embodiments.

It should be understood that division into the units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, the units may be separately disposed processing elements, or may be integrated into a chip of the apparatus for implementation. In addition, the units may be stored in a memory in a program form, and is invoked by a processing element of the apparatus to perform functions of the units. In addition, all or some of the units may be integrated together, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, the units in any one of the foregoing apparatuses may be one or more integrated circuits configured to implement the foregoing method, for example, one or more application-specific integrated circuits (ASICs), one or more microprocessors (DSPs), one or more field programmable gate arrays (FPGAs), or a combination of at least two of these integrated circuit forms. For another example, when the units in the apparatus may be implemented in a form in which a processing element invokes a program, the processing element may be a general-purpose processor, for example, a central processing unit (CPU) or another processor that can invoke the program. For another example, these units may be integrated together and implemented in a form of a system-on-a-chip (SOC).

The transceiver unit is an interface circuit of the apparatus, and is configured to receive a signal from another apparatus. For example, when the apparatus is implemented in a manner of a chip, the transceiver unit is an interface circuit that is of the chip and that is configured to receive and send a signal from another chip or apparatus.

Figure 11:
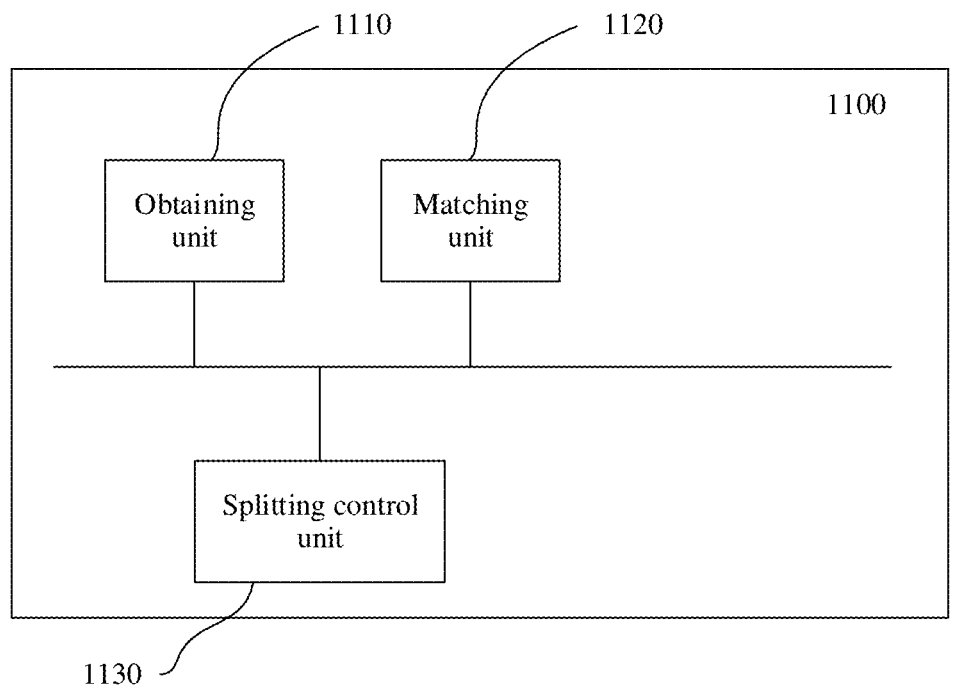
FIG. 11 is a schematic diagram of another communication apparatus according to this application.

FIG. 11 is a schematic diagram of another communication apparatus according to an embodiment of this application. The apparatus is configured to implement the corresponding steps performed by the terminal device in the embodiment in FIG. 3(d) or FIG. 7. As shown in FIG. 11, the apparatus 1100 includes an obtaining unit 1110, a matching unit 1120, and a splitting control unit 1130.

The obtaining unit 1110 is configured to obtain an application detection filter for detecting a data packet generated by an application. The matching unit 1120 is configured to perform matching on a data packet of a first service by using the application detection filter. The splitting control unit 1130 is configured to perform splitting control on the data packet of the first service according to an ATSSS rule.

In a possible implementation method, the obtaining unit 1110 is specifically configured to: receive the ATSSS rule and the application detection filter from a session management network element, where the ATSSS rule includes an application identifier, and the application identifier identifies the application detection filter; receive the ATSSS rule from a session management network element, where the ATSSS rule includes an application identifier and the application detection filter, and the application identifier identifies the application detection filter; receive the ATSSS rule from a session management network element, where the ATSSS rule includes the application detection filter; receive the ATSSS rule and data packet flow description information from a session management network element, where the ATSSS rule includes a data packet flow description identifier, and the data packet flow description identifier identifies the data packet flow description information, and generate the application detection filter based on the data packet flow description information; receive the ATSSS rule from a session management network element, where the ATSSS rule includes a data packet flow description identifier and data packet flow description information, and the data packet flow description identifier identifies the data packet flow description information, and generate the application detection filter based on the data packet flow description information; or receive the ATSSS rule from a session management network element, where the ATSSS rule includes data packet flow description information, and generate the application detection filter based on the data packet flow description information.

Optionally, the communication apparatus 1100 may further include a storage unit. The storage unit is configured to store data or instructions (which may also be referred to as code or a program). The foregoing units may interact with or be coupled to the storage unit, to implement a corresponding method or function. For example, a processing unit may read the data or the instructions in the storage unit, so that the communication apparatus implements the methods in the foregoing embodiments.

It should be understood that division into the units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, the units may be separately disposed processing elements, or may be integrated into a chip of the apparatus for implementation. In addition, the units may be stored in a memory in a program form, and is invoked by a processing element of the apparatus to perform functions of the units. In addition, all or some of the units may be integrated together, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, the units in any one of the foregoing apparatuses may be one or more integrated circuits configured to implement the foregoing method, for example, one or more application-specific integrated circuits (ASICs), one or more microprocessors (DSPs), one or more field programmable gate arrays (FPGAs), or a combination of at least two of these integrated circuit forms. For another example, when the units in the apparatus may be implemented in a form in which a processing element invokes a program, the processing element may be a general-purpose processor, for example, a central processing unit (CPU) or another processor that can invoke the program. For another example, these units may be integrated together and implemented in a form of a system-on-a-chip (SOC).

Figure 12:
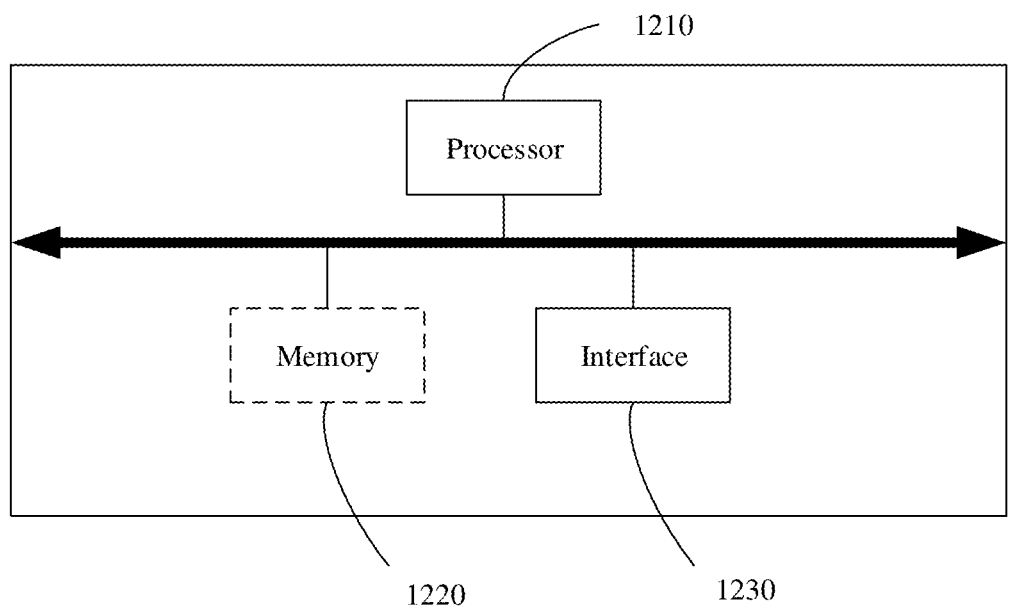
FIG. 12 is a schematic diagram of another communication apparatus according to this application.

FIG. 12 is a schematic diagram of another communication apparatus according to an embodiment of this application. The communication apparatus is configured to implement an operation of the policy control network element or the session management network element in the foregoing embodiments. As shown in FIG. 12, the communication apparatus includes a processor 1210 and an interface 1230. Optionally, the communication apparatus further includes a memory 1220. The interface 1230 is configured to implement communication with another device.

The method performed by the policy control network element or the session management network element in the foregoing embodiments may be implemented by the processor 1210 by invoking a program stored in the memory (which may be the memory 1220 in the policy control network element or the session management network element, or may be an external memory). To be specific, an apparatus used in the policy control network element or the session management network element may include the processor 1210. The processor 1210 invokes the program in the memory, to perform the method performed by the policy control network element or the session management network element in the foregoing method embodiments. The processor herein may be an integrated circuit having a signal processing capability, for example, a CPU. The apparatus used in the policy control network element or the session management network element may be implemented by one or more integrated circuits configured to implement the foregoing methods, for example, one or more ASICs, one or more microprocessors DSPs, one or more FPGAs, or a combination of at least two of these integrated circuit forms. Alternatively, the foregoing implementations may be combined.

Specifically, the processor 1210 in the communication apparatus 1200 shown in FIG. 12 may invoke computer-executable instructions stored in the memory 1220, to implement functions/implementation processes of the obtaining unit 810, the determining unit 820, and the transceiver unit 830 in FIG. 8. Alternatively, the processor 1210 in the communication apparatus 1200 shown in FIG. 12 may invoke computer-executable instructions stored in the memory 1220, to implement functions/implementation processes of the obtaining unit 810 and the determining unit 820 in FIG. 8. Functions/implementation processes of the transceiver unit 830 in FIG. 8 may be implemented through the interface 1230 in the communication apparatus 1200 shown in FIG. 12.

Specifically, the processor 1210 in the communication apparatus 1200 shown in FIG. 12 may invoke computer-executable instructions stored in the memory 1220, to implement functions/implementation processes of the obtaining unit 910, the determining unit 920, and the generation unit 930 in FIG. 9.

Specifically, the processor 1210 in the communication apparatus 1200 shown in FIG. 12 may invoke computer-executable instructions stored in the memory 1220, to implement functions/implementation processes of the transceiver unit 1010 and the generation unit 1020 in FIG. 10. Alternatively, the processor 1210 in the communication apparatus 1200 shown in FIG. 12 may invoke computer-executable instructions stored in the memory 1220, to implement functions/implementation processes of the generation unit 1020 in FIG. 10. Functions/implementation processes of the transceiver unit 1010 in FIG. 10 may be implemented through the interface 1230 in the communication apparatus 1200 shown in FIG. 12.

Figure 13:
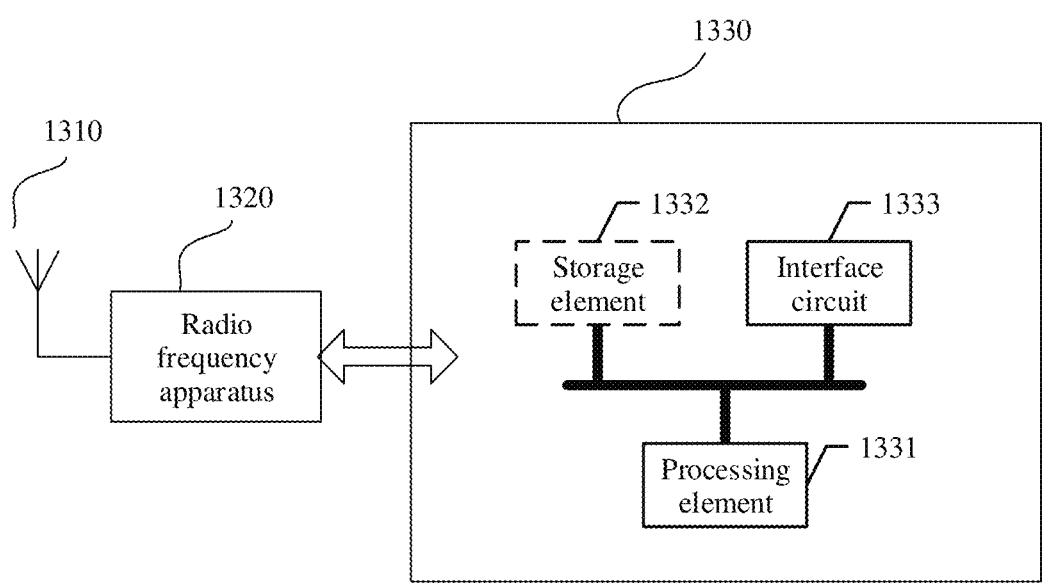
FIG. 13 is a schematic diagram of a terminal device according to this application.

FIG. 13 is a schematic diagram of a structure of a terminal device according to an embodiment of this application. The terminal device is configured to implement operations of the terminal device in the foregoing embodiments. As shown in FIG. 13, the terminal device includes an antenna 1310, a radio frequency apparatus 1320, and a signal processing part 1330. The antenna 1310 is connected to the radio frequency apparatus 1320. In a downlink direction, the radio frequency apparatus 1320 receives, through the antenna 1310, information sent by an access device, and sends, to the signal processing part 1330 for processing, the information sent by the access device. In an uplink direction, the signal processing part 1330 processes information of the terminal device, and sends the information to the radio frequency apparatus 1320. The radio frequency apparatus 1320 processes the information of the terminal device, and then sends the processed information to the access device through the antenna 1310.

The signal processing part 1330 is configured to process each communication protocol layer of data. The signal processing part 1330 may be a subsystem of the terminal device. The terminal device may further include another subsystem, for example, a central processing subsystem, configured to process an operating system and an application layer of the terminal device; and for another example, a peripheral subsystem, configured to connect to another device. The signal processing part 1330 may be a separately disposed chip. Optionally, the foregoing apparatus may be located in the signal processing part 1330.

The signal processing part 1330 may include one or more processing elements 1331, for example, include a main control CPU and another integrated circuit, and include an interface circuit 1333. In addition, the signal processing part 1330 may further include a storage element 1332. The storage element 1332 is configured to store data and a program. The program used to perform the method performed by the terminal device in the foregoing method may be stored or may not be stored in the storage element 1332, for example, stored in a memory outside the signal processing part 1330. When used, the signal processing part 1330 loads the program to a cache for use. The interface circuit 1333 is configured to communicate with the apparatus. The foregoing apparatus may be located in the signal processing part 1330. The signal processing part 1330 may be implemented by a chip. The chip includes at least one processing element and an interface circuit. The processing element is configured to perform steps of any method performed by the foregoing terminal device. The interface circuit is configured to communicate with another apparatus. In an implementation, units that implement the steps in the foregoing methods may be implemented in a form of a program invoked by a processing element. For example, the apparatus includes a processing element and a storage element. The processing element invokes a program stored in the storage element, to perform the method performed by the terminal device in the foregoing method embodiments. The storage element may be a storage element located on a same chip as the processing element, namely, an on-chip storage element.

In another implementation, a program used to perform the method performed by the terminal device in the foregoing methods may be in a storage element that is on a different chip from the processing unit, namely, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. These processing elements are disposed in the signal processing part 1330. The processing element herein may be an integrated circuit, for example, one or more ASICs, one or more DSPs, one or more FPGAs, or a combination of these types of integrated circuits. These integrated circuits may be integrated together to form a chip.

The units for implementing the steps in the foregoing methods may be integrated together and implemented in a form of a system-on-a-chip (SOC). The SOC chip is configured to implement the foregoing methods. At least one processing element and storage element may be integrated into the chip, and the processing element invokes a program stored in the storage element to implement the foregoing method performed by the terminal device. Alternatively, at least one integrated circuit may be integrated into the chip, to implement the foregoing method performed by the terminal device. Alternatively, with reference to the foregoing implementations, functions of some units may be implemented by invoking a program by the processing element, and functions of some units may be implemented by the integrated circuit.

It can be learned that the foregoing apparatus may include at least one processing element and interface circuit. The at least one processing element is configured to perform any method that is provided in the foregoing method embodiments and performed by the terminal device. The processing element may perform some or all steps performed by the terminal device in a first manner, to be specific, by invoking a program stored in the storage element; or may perform some or all steps performed by the terminal device in a second manner, to be specific, by combining instructions and a hardware integrated logic circuit in a processor element. Certainly, some or all steps performed by the terminal device may be alternatively performed by combining the first manner and the second manner.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of these integrated circuit forms. The storage element may be one memory, or may be a general term of a plurality of storage elements.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a random access memory (RAM), a flash memory, a read-only memory (ROM), an EPROM memory, an EEPROM memory, a register, a hard disk, a removable magnetic disk, a CD-ROM, or a storage medium of any other form in the art. Exemplarily, the storage medium may connect to a processor so that the processor may read information from the storage medium and write information to the storage medium. Alternatively, the storage medium may be integrated into a processor. The processor and the storage medium may be disposed in the ASIC.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

In one or more example designs, the foregoing functions in this application may be implemented by using hardware, software, firmware, or any combination thereof. If the functions are implemented by using software, the functions may be stored in a computer-readable medium or are transmitted to the computer-readable medium in a form of one or more instructions or code. The computer-readable medium includes a computer storage medium or a communication medium that enables a computer program to be transferred from one place to another. The storage medium may be an available medium that may be accessed by any general-purpose or special computer. For example, such a computer-readable medium may include but is not limited to a RAM, a ROM, an EEPROM, a CD-ROM, or another optical disc storage, a disk storage or another magnetic storage apparatus, or any other medium that may be for bearing or storing program code, where the program code is in a form of an instruction or a data structure or in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk and the disc include a compact disc, a laser disc, an optical disc, a digital versatile disc (DVD for short), a floppy disk, and a Blu-ray disc. The disc usually copies data by a magnetic means, and the disk optically copies data by a laser means. The foregoing combination may also be included in the computer-readable medium.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application. According to the foregoing descriptions of this specification in this application, technologies in the art may use or implement the content of this application. Any modification based on the disclosed content shall be considered obvious in the art. The basic principles in this application may be applied to other variations without departing from the inventive essence and scope of this application. Therefore, the content disclosed in this application is not limited to embodiments and the designs but may also be extended to a maximum scope that is consistent with the principles and disclosed new features of this application.

Although this application is described with reference to specific features and embodiments thereof, it is clear that various modifications and combinations may be made to this application without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method, comprising:
    obtaining, by a policy control network element, an application identifier and an operating system identifier of a terminal device;
    determining, by the policy control network element, a first application descriptor corresponding to the application identifier, wherein the first application descriptor comprises the operating system identifier of the terminal device, and an operating system application identifier of the terminal device; and
    sending, by the policy control network element, the first application descriptor to a session management network element, wherein the first application descriptor is usable for generating an access traffic steering, switching, and splitting rule, and the access traffic steering, switching, and splitting rule comprises the first application descriptor.

2. The method according to claim 1, wherein the sending, by the policy control network element, the first application descriptor to the session management network element comprises:
    sending, by the policy control network element, a policy and charging control rule to the session management network element, wherein the policy and charging control rule comprises the application identifier, and the first application descriptor.

3. The communication method according to claim 1, wherein the policy control network element is a policy control function (PCF) network element.

4. The method according to claim 1, wherein the determining, by the policy control network element, the first application descriptor corresponding to the application identifier comprises:
    determining, by the policy control network element and based on a correspondence among the operating system identifier, the application identifier, and the first application descriptor, the first application descriptor corresponds to the operating system identifier and the application identifier, wherein
    the correspondence is stored in at least one of the policy control network element, a unified data repository, a network exposure function network element, or an application function network element.

5. The method according to claim 1, wherein the determining, by the policy control network element, the first application descriptor corresponding to the application identifier comprises:
    determining, by the policy control network element, a second application descriptor based on the application identifier, the second application descriptor corresponding to the application identifier; and
    determining, by the policy control network element, the first application descriptor based on the operating system identifier and the second application descriptor, the first application descriptor being in the second application descriptor, and the first application descriptor corresponding to the operating system identifier.

6. The method according to claim 1, wherein the obtaining, by the policy control network element, the operating system identifier of the terminal device comprises:
    receiving, by the policy control network element, identification information of the terminal device from the session management network element; and
    obtaining, from a unified data repository, the operating system identifier of the terminal device, the operating system identification corresponding to the identification information of the terminal device.

7. A communication apparatus, comprising:
a processor; and
a non-transitory computer-readable storage medium coupled to the processor, and configured to store non-transitory instructions, the processor being configured to execute the non-transitory instructions to thereby cause the apparatus to perform operations comprising:
obtaining an application identifier and an operating system identifier of a terminal device;
determining a first application descriptor corresponding to the application identifier, wherein the first application descriptor comprises the operating system identifier of the terminal device, and an operating system application identifier of the terminal device; and
sending the first application descriptor to a session management network element, wherein the first application descriptor is usable for generating an access traffic steering, switching, and splitting rule, and the access traffic steering, switching, and splitting rule comprises the first application descriptor, wherein the communication apparatus is a policy control network element.

8. The apparatus according to claim 7, wherein the sending the first application descriptor to the session management network element comprises:
sending a policy and charging control rule to the session management network element, wherein the policy and charging control rule comprises the application identifier, and the first application descriptor.

9. The apparatus according to claim 7, wherein the determining the first application descriptor corresponding to the application identifier comprises:
determining, based on the application identifier, a second application descriptor corresponding to the application identifier; and
determining, based on the operating system identifier and the second application descriptor, the first application descriptor in the second application descriptor, and the first application descriptor corresponding to the operating system identifier.

10. The apparatus according to claim 7, wherein the obtaining the application identifier comprises:
receiving identification information of the terminal device from the session management network element; and
obtaining, from a unified data repository, the operating system identifier of the terminal device, the operating system identification corresponding to the identification information of the terminal device.

11. A communication system, comprising:
a policy control network element; and
a session management network element, wherein the policy control network element is configured to:
obtain an application identifier and an operating system identifier of a terminal device;
determine a first application descriptor corresponding to the application identifier, wherein the first application descriptor comprises the operating system identifier of the terminal device, and an operating system application identifier of the terminal device; and
send the first application descriptor to the session management network element; and the session management network element is configured to:
receive the first application descriptor from the policy control network element; and
generate an access traffic steering, switching, and splitting rule based on the first application descriptor, wherein the access traffic steering, switching, and splitting rule comprises the first application descriptor.

12. The communication system according to claim 11, wherein the policy control network element configured to send the first application descriptor to the session management network element comprises the policy control network element being further configured to:
send a policy and charging control rule to the session management network element, wherein the policy and charging control rule comprises the application identifier and the first application descriptor.

13. The communication system according to claim 11, wherein the policy control network element configured to obtain the operating system identifier of the terminal device comprises the policy control network element being further configured to:
receive identification information of the terminal device from the session management network element; and
obtain, from a unified data repository, the operating system identifier of the terminal device, the operating system identification corresponding to the identification information of the terminal device.

14. A communication method, comprising:
obtaining, by a policy control network element, an application identifier and an operating system identifier of a terminal device;
determining, by the policy control network element, a first application descriptor corresponding to the application identifier, wherein the first application descriptor comprises the operating system identifier of the terminal device, and an operating system application identifier of the terminal device;
sending, by the policy control network element, the first application descriptor to a session management network element; and
generating, by the session management network element, an access traffic steering, switching, and splitting rule based on the first application descriptor, wherein the access traffic steering, switching, and splitting rule comprises the first application descriptor.

15. The communication method according to claim 14, wherein the sending the first application descriptor to the session management network element comprises:
sending a policy and charging control rule to the session management network element, wherein the policy and charging control rule comprises the application identifier and the first application descriptor.

16. The communication method according to claim 14, wherein the obtaining the operating system identifier comprises:
receiving identification information of the terminal device from the session management network element; and
obtaining, from a unified data repository, the operating system identifier of the terminal device, the operating system identification corresponding to the identification information of the terminal device.

* * * * *